US012743064B2

(12) United States Patent
Farquhar et al.

(10) Patent No.: US 12,743,064 B2
(45) Date of Patent: Sep. 22, 2026

(54) ACTIVE FAN BALANCING

(71) Applicant: FlexGen Power Systems, LLC, Durham, NC (US)

(72) Inventors: Norman Ross Farquhar, Wheat Ridge, CO (US); Joshua Chase Adams, Canby, OR (US); Jacob Hansen, Newburyport, MA (US); Walter Donald Tate, Vancouver, WA (US); Pooja Latthe, Bothell, WA (US)

(73) Assignee: FlexGen Power Systems, LLC, Durham, NC (US)

( * ) Notice: Subject to any disclaimer, the term of this patent is extended or adjusted under 35 U.S.C. 154(b) by 819 days.

(21) Appl. No.: 18/081,524

(22) Filed: Dec. 14, 2022

(65) Prior Publication Data

US 2024/0194968 A1 Jun. 13, 2024

Related U.S. Application Data

(60) Provisional application No. 63/431,629, filed on Dec. 9, 2022.

(51) Int. Cl.

| | |
|---|---|
| ***G05B 19/00*** | (2006.01) |
| ***G05B 19/042*** | (2006.01) |
| ***H01M 10/633*** | (2014.01) |
| ***H01M 10/663*** | (2014.01) |

(52) U.S. Cl.

CPC ........ *G05B 19/042* (2013.01); *H01M 10/633* (2015.04); *H01M 10/663* (2015.04); *G05B 2219/49216* (2013.01)

(58) Field of Classification Search

CPC ....... G05B 19/042; G05B 2219/49216; H01M 10/663; H01M 10/633

USPC .......................................................... 318/594

See application file for complete search history.

(56) References Cited

U.S. PATENT DOCUMENTS

| | | | | |
|---|---|---|---|---|
| 10,998,587 | B2 * | 5/2021 | Walker | H01M 10/6563 |
| 2017/0093187 | A1 * | 3/2017 | Park | H02J 3/381 |
| 2017/0365893 | A1 * | 12/2017 | Kim | G05B 19/0423 |
| 2022/0136782 | A1 * | 5/2022 | Sawafta | F28D 20/028<br>165/10 |
| 2022/0181713 | A1 * | 6/2022 | Beaston | H01M 10/613 |

* cited by examiner

*Primary Examiner* — Gabriel Agared

(74) *Attorney, Agent, or Firm* — Ashurst Perkins Coie US LLP

(57) ABSTRACT

Techniques and solutions are provided for controlling fans associated with battery racks located in an enclosure. The fans can be ranked according to different criteria, such as using an average temperature of cells in a battery rack, a temperature of an enclosure housing the battery racks, an average temperature of battery racks in the enclosure, or using information about the spread of cell temperature of cells in particular racks. Higher-ranked racks can have their fans turned to an active state. In some cases, different ranking techniques can be used for different operational modes of an HVAC unit in communication with the enclosure. Disclosed techniques can have various benefits, such as improving ventilation of the enclosure, prioritizing heating or cooling of particular racks, or reducing temperature gradients, or temperature spread, between battery racks in an enclosure.

20 Claims, 15 Drawing Sheets

400

```
###################### Cooling mode ranking ######################
if cooling_mode:
    # Rank racks based on cooling mode algorithm
    rack_to_enclosure_rank = (avg_rack_temps - encl_avg_temp) / abs(avg_rack_temps - encl_avg_temp).max()
    rack_to_target_rank = (avg_rack_temps - target_cell_temp) / abs(avg_rack_temps - target_cell_temp).max()
    rack_range_rank = rack_ranges / rack_ranges.max()

    # Set min and max fans based on user config params
    min_fans = HVAC_ON_min_fans * num_HVACs
    max_fans = HVAC_ON_max_fans * num_HVACs

    graph_title_string = "Post-fan ranking temperatures - Cooling Mode"

    # function defined in lower cell
    rank_to_fans_and_plot(rack_to_enclosure_weight,rack_to_enclosure_rank,
                          rack_to_target_weight,rack_to_target_rank,
                         rack_range_weight,rack_range_rank,
                         num_racks,pos_rank_mode,min_fans,max_fans,rack_sequence,
                         min_rack_cell_temps,avg_rack_temps,max_rack_cell_temps,graph_title_string)

elif heating_mode:
    # Rank racks based on heating mode algorithm
    rack_to_enclosure_rank = (encl_avg_temp - avg_rack_temps) / abs(encl_avg_temp - avg_rack_temps).max()
    rack_to_target_rank = (target_cell_temp - avg_rack_temps) / abs(target_cell_temp - avg_rack_temps).max()
    rack_range_rank = rack_ranges / rack_ranges.max()

    # Set min and max fans based on user config params
    min_fans = HVAC_ON_min_fans * num_HVACs
    max_fans = HVAC_ON_max_fans * num_HVACs

    graph_title_string = "Post-fan ranking temperatures - Heating Mode"

    # function defined in lower cell
    rank_to_fans_and_plot(rack_to_enclosure_weight,rack_to_enclosure_rank,
                          rack_to_target_weight,rack_to_target_rank,
                         rack_range_weight,rack_range_rank,
                         num_racks,pos_rank_mode,min_fans,max_fans,rack_sequence,
                         min_rack_cell_temps,avg_rack_temps,max_rack_cell_temps,graph_title_string)

# Not cooling or heating
elif standby_mode:
    # Rank racks based on standby mode algorithm
    rack_to_enclosure_rank = abs(avg_rack_temps - encl_avg_temp) / abs(avg_rack_temps - encl_avg_temp).max()
    rack_to_target_rank = abs(avg_rack_temps - target_cell_temp) / abs(avg_rack_temps - target_cell_temp).max()
    rack_range_rank = rack_ranges / rack_ranges.max()

    # Set min and max fans based on user config params
    min_fans = STANDBY_min_fans
    max_fans = STANDBY_max_fans

    graph_title_string = "Post-fan ranking temperatures - Neither Mode"

    # function defined in lower cell
    rank_to_fans_and_plot(rack_to_enclosure_weight,rack_to_enclosure_rank,
                          rack_to_target_weight,rack_to_target_rank,
                         rack_range_weight,rack_range_rank,
                         num_racks,pos_rank_mode,min_fans,max_fans,rack_sequence,
                         min_rack_cell_temps,avg_rack_temps,max_rack_cell_temps,graph_title_string)

else:
    print('MUST SELECT COOLING, HEATING, OR STANDBY MODES')
```

```
def rank_to_fans_and_plot(rack_to_enclosure_weight,rack_to_enclosure_rank,
                    rack_to_target_weight,rack_to_target_rank,
                    rack_range_weight,rack_range_rank,
                    num_racks,pos_rank_mode,min_fans,max_fans,rack_sequence,
                    min_rack_cell_temps,avg_rack_temps,max_rack_cell_temps,graph_title_string):

  final_rank = rack_to_enclosure_weight * rack_to_enclosure_rank \
            + rack_to_target_weight * rack_to_target_rank \
            + rack_range_weight * rack_range_rank

  print(f"There are {num_racks} total racks.")
  print(f"{(final_rank >= 0).sum()} racks are ranked >= 0.")
  print(f"{(final_rank < 0).sum()} racks are ranked < 0.")
  print(f"{(final_rank >= final_rank.mean() + final_rank.std()).sum()} racks are >1 stdev above mean rank.")

  # if positive rank mode, turn on all fans with positive rank within min/max boundaries
  # generates an array of rack fan numbers (self-add 1 to counter-act python 0 indexing)
  if pos_rank_mode:

    # If the number of positive-ranked fans exceeds the max, use the highest-ranked fans up to the max
    if len(np.argwhere(final_rank>=0)) > max_fans:
      fans_on = np.argpartition(final_rank,-1*max_fans)[-1*max_fans:]
      fans_on += 1
      print(f"Positive-ranked fans EXCEEDED max_fans. Turning on {max_fans} max_fans.")

    # If the number of positive-ranked fans is less than the min, use the highest-ranked min number of fans
    elif len(np.argwhere(final_rank>=0)) < min_fans:
      fans_on = np.argpartition(final_rank,-1*min_fans)[-1*min_fans:]
      fans_on += 1
      print(f"Positive-ranked fans were BELOW min_fans. Turning on {min_fans} min_fans.")

    # If the number of positive-ranked fans is within the min-max range, use only positive-ranked fans
    else:
      fans_on = np.argwhere(final_rank>=0)
      fans_on += 1
      print(f"Positive-ranked fans were WITHIN min-max fans. Turning on {len(np.argwhere(final_rank>=0))} fans.")

  # if not pos rank mode, use target num of racks
  # generates an array of rack fan numbers (self-add 1 to counter-act python 0 indexing)
  else:
    fans_on = np.argpartition(final_rank,-1*num_fans)[-1*num_fans:]
    fans_on += 1

  print(f"\n\n The final rack fan group to turn on is {fans_on.transpose()}.")

  # Generate plot of min/avg/max cell temps by rack, with fans on marked
  fig = plt.scatter(rack_sequence, min_rack_cell_temps, marker="_", label="Min Cell Temp")
  _= plt.scatter(rack_sequence,avg_rack_temps,label="Avg Cell Temp")
  _= plt.scatter(rack_sequence,max_rack_cell_temps,marker="+",label="Max Cell Temp")
  _= plt.scatter(fans_on,avg_rack_temps[fans_on-1],marker="*",color="black",label="Fan Targeted for ON")
  _ = plt.legend(bbox_to_anchor=(0.5, -0.25), loc='center',ncol=2)
  _ = plt.xlabel("Rack number")
  _ = plt.ylabel("Temperature (C)")
  _ = plt.title(f"{graph_title_string}")
  plt.show()
```

FIG. 4D 508 510 512 514 500

| | Rack Rank | Rack Number | Avg Temp | Max Temp | Min Temp | OOR | Previous State | Fan Delay Passed | Final State |
|---|---|---|---|---|---|---|---|---|---|
| 14 | 0.401104 | 15 | 19.773333 | 21.000000 | 19.000000 | 0 | OFF | FALSE | OFF |
| 17 | 0.308774 | 18 | 20.000000 | 21.000000 | 19.800000 | 0 | OFF | FALSE | OFF |
| 4 | 0.282327 | 5 | 20.233333 | 21.000000 | 19.000000 | 0 | OFF | FALSE | OFF |
| 5 | 0.275442 | 6 | 20.260000 | 21.000000 | 19.000000 | 0 | ON | TRUE | ON |
| 13 | 0.213630 | 14 | 20.946667 | 22.000000 | 17.266667 | 0 | OFF | TRUE | ON |
| 3 | 0.157603 | 4 | 20.640000 | 21.533333 | 20.000000 | 0 | OFF | TRUE | ON |
| 18 | 0.109247 | 19 | 20.740000 | 21.000000 | 20.000000 | 0 | OFF | FALSE | OFF |
| 7 | 0.099545 | 8 | 20.886667 | 21.266667 | 19.600000 | 0 | ON | TRUE | ON |
| 6 | 0.081705 | 7 | 20.846667 | 21.000000 | 20.000000 | 0 | ON | FALSE | ON |
| 16 | 0.062916 | 17 | 19.146667 | 20.000000 | 18.000000 | 1 | ON | FALSE | ON |
| 2 | -0.058511 | 3 | 21.553333 | 23.000000 | 21.000000 | 0 | OFF | TRUE | ON |
| 15 | -0.077457 | 16 | 19.526667 | 20.000000 | 19.000000 | 1 | ON | FALSE | ON |
| 8 | -0.092939 | 9 | 21.686667 | 23.000000 | 21.000000 | 0 | OFF | TRUE | ON |
| 19 | -0.273999 | 20 | 22.333333 | 23.000000 | 21.333333 | 0 | OFF | TRUE | OFF |
| 11 | -0.347706 | 12 | 22.673333 | 24.000000 | 22.000000 | 0 | OFF | TRUE | OFF |
| 1 | -0.388238 | 2 | 22.666667 | 23.000000 | 22.000000 | 0 | OFF | FALSE | OFF |
| 9 | -0.422979 | 10 | 22.866667 | 23.400000 | 22.000000 | 0 | OFF | FALSE | OFF |
| 10 | -0.432055 | 11 | 23.000000 | 24.000000 | 22.000000 | 0 | ON | TRUE | OFF |
| 0 | -0.471647 | 1 | 23.153333 | 24.000000 | 22.000000 | 0 | ON | TRUE | OFF |
| 12 | -0.750526 | 13 | 22.133333 | 23.000000 | 22.000000 | 1 | ON | FALSE | ON |

520

522

```
array([0, 0, 0, 0, 0, 0, 0, 0, 0, 1, 0, 1, 0, 0, 1, 0, 0, 0, 0, 1])
```

524

```
OOR_weight = 0.5
OOR_array = OOR_racks * OOR_weight
OOR_array
```

526

```
array([0. , 0. , 0. ,  0. , 0. , 0. , 0. , 0. , 0. , 0.5 , 0. , 0.5, 0. , 0., 0., 0. , 0.
, 0. , 0. , 0.5 ])
```

```
final_rank = (rack_to_enclosure_weight * rack_to_enclosure_rank \
               + rack_to_target_weight * rack_to_target_rank \
               + rack_range_weight * rack_range_rank) - OOR_array
```

528

```
array([0.401104, 0.308774, 0.282327, 0.275422, 0.213630, 0.157603,
,      0.109247,  0.099545,  0.081705,  -0.437084, -0.058511,
,       -0.577457,  -0.092939,  -0.273999, -0.237706, -0.388238,
,      -0.422979, -0.432055, -0.471647, -1.250526])
```

```
rack_num = np.linspace(1,20,20)
  arr = np.array([final_rank,rack_num,avg_rack_temps,max_rack_cell_temps,min_rack_cell_temps,OOR_racks,
          rackonoff,rackfandelaypassed]).transpose()
  state_df = pd.DataFrame(data=arr,columns=["Rack Rank","Rack Number","Avg Temp","Max Temp","Min Temp","OOR",
                    "On/Off","Fan Delay Passed"])
  state_df["Rack Rank"] = state_df["Rack Rank"].astype(float)
  state_df["Avg Temp"] = state_df["Avg Temp"].astype(float)
  state_df["Max Temp"] = state_df["Max Temp"].astype(float)
  state_df["Min Temp"] = state_df["Min Temp"].astype(float)
  state_df["Rack Number"] = state_df["Rack Number"].astype(float).astype(int)

  ################# Determine fans that we can't turn OFF (haven't passed FanDelay) ######

  MUST_ON_df = state_df[((state_df["On/Off"] == "ON") & (state_df["Fan Delay Passed"] == "FALSE"))]

  ################# Determine fans that we can't turn ON (to show in plot) ##############
  STAY_OFF_df = state_df[((state_df["On/Off"] == "OFF") & (state_df["Fan Delay Passed"] == "FALSE"))]

  ################# Determine fans that can receive signals (have passed FanDelay) #######

  Sig_df = state_df[state_df["Fan Delay Passed"] == "TRUE"]

  ################# Determine fans that are OOR #########################################

  OOR_df = state_df[state_df["OOR"] == "1"]

  ################# Of the fans that can receive signals, determine group to turn ON ########
  # If the number of positive-ranked fans exceeds the max, use the highest-ranked fans up to the max
  if len(Sig_df[Sig_df["Rack Rank"] >= 0]) > (max_fans - len(MUST_ON_df)):
    fans_on = Sig_df.sort_values(by="Rack Rank",ascending=False).iloc[:(max_fans-len(MUST_ON_df))][:]
    print(f"Positive-ranked, signallable fans EXCEEDED max_fans.")
    print(f"     {len(MUST_ON_df)} fans must stay ON (FanDelay).")
    print(f"     {len(STAY_OFF_df)} fans must stay OFF (FanDelay).")
    print(f"Turning on {len(fans_on)} fans.")
    print(f"There will be {len(fans_on) + len(MUST_ON_df)} total fans operating.")

  # If the total rack fans in enclosure minus number of fans that must stay off is < min fans, OVERRIDE FanDelay and pick the highest-ranked min number of fans
  elif (len(state_df) - len(STAY_OFF_df)) < min_fans:
    fans_on = state_df.sort_values(by="Rack Rank",ascending=False).iloc[:(min_fans)][:]
    # We should re-set the fan timer here for all fans so that we can start fresh.
    # This should almost never happen -- but we could set a flag to keep track of it
    print(f"OVERRIDING Fan Delay because of min fans")
    print(f"     {len(MUST_ON_df)} fans must stay ON (FanDelay).")
    print(f"     {len(STAY_OFF_df)} fans must stay OFF (FanDelay).")
    print(f"There will be {len(fans_on)} total fans operating.")
```

Figure 7:
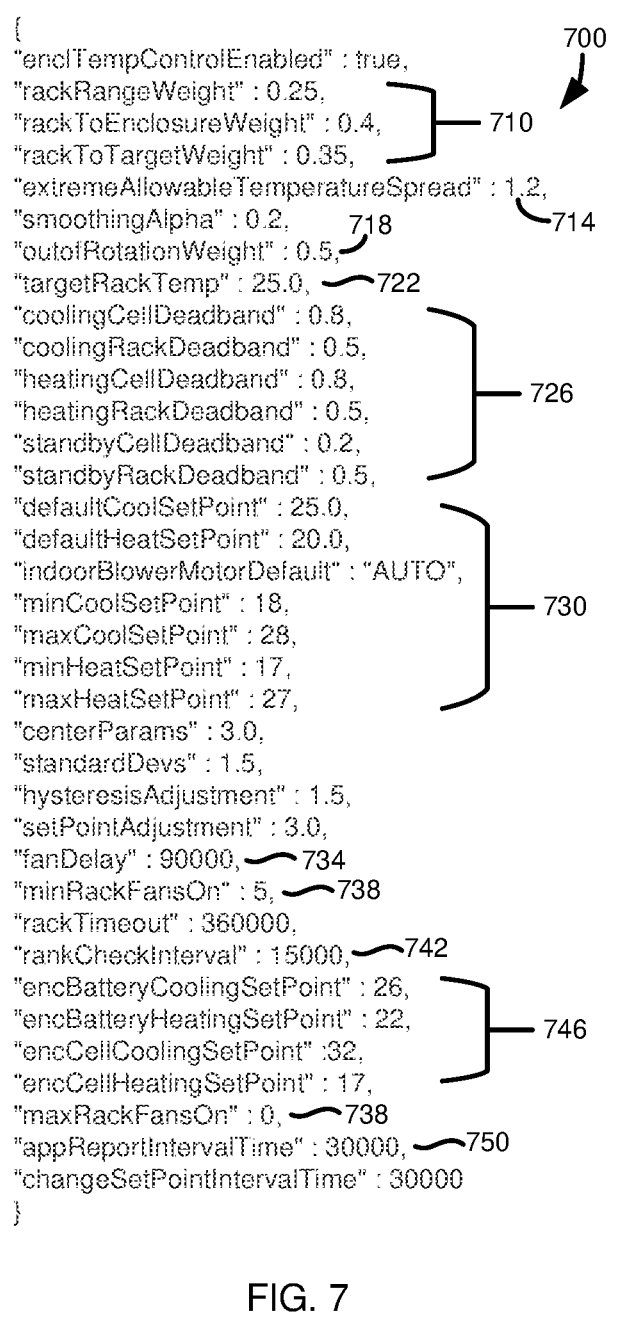

{
"enclTempControlEnabled" : true,
"rackRangeWeight" : 0.25,
"rackToEnclosureWeight" : 0.4,
"rackToTargetWeight" : 0.35,
"extremeAllowableTemperatureSpread" : 1.2,
"smoothingAlpha" : 0.2,
"outofRotationWeight" : 0.5,
"targetRackTemp" : 25.0,
"coolingCellDeadband" : 0.8,
"coolingRackDeadband" : 0.5,
"heatingCellDeadband" : 0.8,
"heatingRackDeadband" : 0.5,
"standbyCellDeadband" : 0.2,
"standbyRackDeadband" : 0.5,
"defaultCoolSetPoint" : 25.0,
"defaultHeatSetPoint" : 20.0,
"indoorBlowerMotorDefault" : "AUTO",
"minCoolSetPoint" : 18,
"maxCoolSetPoint" : 28,
"minHeatSetPoint" : 17,
"maxHeatSetPoint" : 27,
"centerParams" : 3.0,
"standardDevs" : 1.5,
"hysteresisAdjustment" : 1.5,
"setPointAdjustment" : 3.0,
"fanDelay" : 90000,
"minRackFansOn" : 5,
"rackTimeout" : 360000,
"rankCheckInterval" : 15000,
"encBatteryCoolingSetPoint" : 26,
"encBatteryHeatingSetPoint" : 22,
"encCellCoolingSetPoint" :32,
"encCellHeatingSetPoint" : 17,
"maxRackFansOn" : 0,
"appReportIntervalTime" : 30000,
"changeSetPointIntervalTime" : 30000
}

ACTIVE FAN BALANCING

CROSS-REFERENCE TO RELATED APPLICATION

This application claims the benefit of, and incorporates by reference, U.S. Provisional Patent Application No. 63/431,629, filed Dec. 9, 2022.

FIELD

The present disclosure relates to selectively activating ventilation fans to improve heating or cooling of components. Particular implementations relate to selectively activating fans of battery racks within an enclosure of an energy storage unit.

BACKGROUND

Cooling is an issue in many product designs, particularly when a product has an enclosure in which heat is generated. In some cases, internal heat within an enclosure can be addressed by ventilating the enclosure. While in some cases passive ventilation may be sufficient, in other cases active ventilation may be desirable to move quickly or thoroughly cool the interior of an enclosure, including to protect the operation of various electronic or mechanical components located inside the enclosure.

As a particular example, energy storage is becoming increasingly important. One type of energy storage involves an enclosure having a plurality of battery racks. Failure to adequately ventilate the enclosure, both due to environmental heat and heat generated by operation of the batteries can lead to increased battery degradation, and can lead to unsafe conditions for the batteries themselves. Similar considerations can apply when it may be desired to heat battery racks to maintain a desired temperature, such as when an enclosure in which the batteries are placed is located in a cold environment. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for controlling fans associated with battery racks located in an enclosure. The fans can be ranked according to different criteria, such as using an average temperature of cells in a battery rack, a temperature of an enclosure housing the battery racks, an average temperature of battery racks in the enclosure, or using information about the spread of cell temperature of cells in particular racks. Higher-ranked racks can have their fans turned to an active state. In some cases, different ranking techniques can be used for different operational modes of an HVAC unit in communication with the enclosure. Disclosed techniques can have various benefits, such as improving ventilation of the enclosure, prioritizing heating or cooling of particular racks, or reducing temperature gradients, or temperature spread, between battery racks in an enclosure.

In one aspect, the present disclosure provides a process for activating a portion of battery rack fans according to a ranking. Temperature information is received for a plurality of battery racks, respective battery racks of the plurality of racks including a plurality of battery cells and being associated with one or more battery rack fans. At least a portion of the plurality of battery racks are ranked by comparing a first temperature parameter for a given battery rack of the at least a portion of the battery racks with a second temperature parameter calculated from at least a portion of the plurality of battery racks, the second temperature parameter being determined at least in part from temperature information from a battery rack of the at least a portion of the battery racks other than the given battery rack. At least a portion of the battery rack fans are set to an active state based at least in part on the ranking.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 4A, 4B, and 4D are example pseudocode for a disclosed active fan balancing technique, while

FIG. 5 illustrates example output of a disclosed active fan balancing technique, and pseudocode that can be used to adjust battery rack rankings to account for out of rotation battery racks.

FIGS. 6A-6C illustrates example pseudocode that incorporates various enhancements into an active fan balancing technique.

FIG. 7 illustrates example configuration parameters that can be used in adjusting the operational mode of an HVAC unit or battery rack fans.

DETAILED DESCRIPTION

Example 1—Overview

Figure 1:
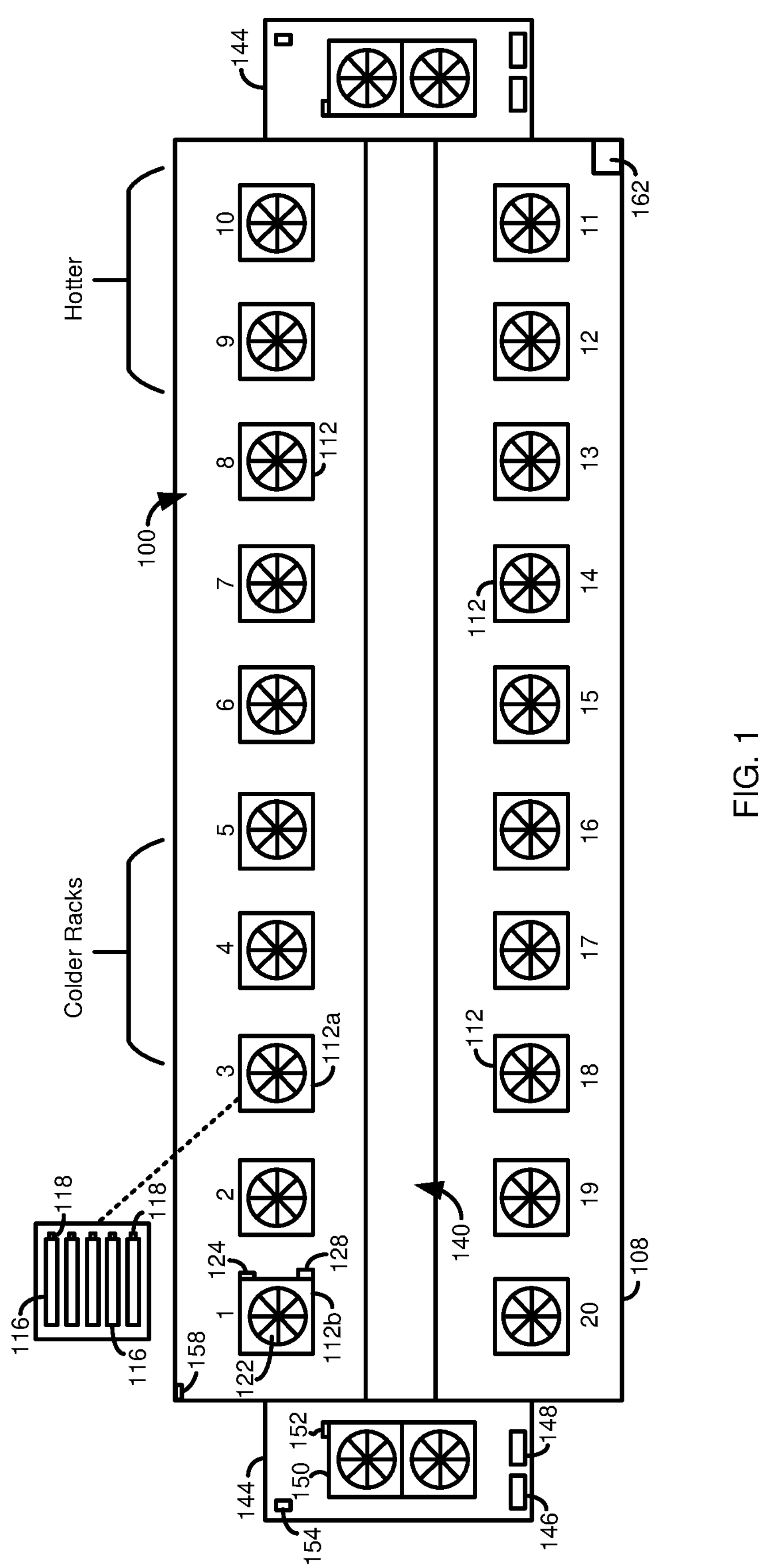
FIG. 1 is a block diagram of an example energy storage unit with which disclosed techniques can be implemented.

Cooling is an issue in many product designs, particularly when a product has an enclosure in which heat is generated. In some cases, internal heat within an enclosure can be addressed by ventilating the enclosure. While in some cases passive ventilation may be sufficient, in other cases active ventilation may be desirable to move quickly or thoroughly cool the interior of an enclosure, including to protect the operation of various electronic or mechanical components located inside the enclosure.

As a particular example, energy storage is becoming increasingly important. One type of energy storage involves an enclosure having a plurality of battery racks. Failure to adequately ventilate the enclosure, both due to environmental heat and heat generated by operation of the batteries can lead to increased battery degradation, and can lead to unsafe conditions for the batteries themselves. Similar considerations can apply when it may be desired to heat battery racks to maintain a desired temperature, such as when an enclosure in which the batteries are placed is located in a cold environment. Accordingly, room for improvement exists.

Continuing with the example enclosure with battery racks, in some cases, heating and cooling units can be included for an enclosure to help maintain a desired set of operating conditions. At least certain enclosures have a series of battery racks placed about a central duct or other fluid passageway. The duct can allow for the passage of air proximate the battery racks, moving the air through the duct and outside of the enclosure, thus cooling or heating the battery racks, depending on whether an optional HVAC unit is in a heating, cooling, or idling mode.

Assume that a duct has two ends, one for air intake and one for air outtake. Since different battery racks are located at different points within the enclosure, they may be heated or cooled to different degrees. In some cases, individual battery racks can be provided with fans to circulate air around the battery racks and provide more even temperature regulation with the enclosure. However, problems can still arise with regulating the temperature of the battery racks, including having temperature gradients within the enclosure. In particular, techniques such as uncontrolled fan activation, sequential fan activation, or random fan activation can result in uneven temperature spreads among racks in an enclosure, which can lead to less available energy from associated battery cells and increased battery cell degradation.

The present disclosure provides techniques and solutions for improved temperature management for a set of battery racks. The operational parameters of battery racks within an enclosure can be monitored, such as temperature of the battery racks or a spread in the temperature of individual battery cells within a battery rack. A temperature of an enclosure in which the battery racks are located can also be measured.

The temperature information can be used to rank the battery racks according to various criteria. For example, battery racks can be ranked according to one or more of a comparison of an average temperature of a battery rack to an average battery rack temperature for battery racks within an enclosure, a comparison of a battery rack temperature to a target battery cell temperature, or a measure of variation between hottest and coldest cells within a given battery rack. In particular implementations, a weighted combination of multiple of these values can be used to determine an overall ranking. The ranking information can be used to determine what battery rack fans should be activated, including within set values for a maximum or minimum number of active fans.

In this way, fans can be activated for battery racks most in need of temperature regulation, where the ranking algorithms determine the meaning of "need." The battery rack rankings can be recalculated, including at a determined interval. As battery rack temperatures change over time, the active fans can be adjusted so that temperature regulation is applied in an optimized manner.

Disclosed techniques can provide a number of benefits. By dynamically determining what battery rack fans should be active, better overall temperature regulation of an apparatus that includes the battery racks can be provided, including improving performance of the apparatus, or reducing the chances of a safety issue occurring (such as if a battery rack exceeds threshold values for a maximum temperature or a minimum temperature). Disclosed techniques can also be more energy efficient, or reduce wear and tear on battery rack fans.

Example 2—Example Energy Storage Unit with HVAC Units and Battery Rack Fans

FIG. 1 illustrates an example apparatus with which disclosed techniques can be implemented. The apparatus is in the form of an energy storage unit 100 that includes an enclosure 108 that houses a plurality of battery racks 112. Without limiting the scope of the present disclosure, battery racks that are suitable for use as the battery racks 112 include STACK™ battery racks, available from Powin LLC, of Portland, Oregon.

As shown for battery rack 112*a*, which can be representative of the other battery racks 112, a given battery rack includes a plurality of battery cells 116 distributed throughout the rack. Because some of the cells are closer to the exterior of the battery rack 112*a*, and some are closer to the center, the temperatures of cells within the rack can vary. In at least some implementations, one or more of the battery cells 116 can include a temperature sensor 118. A battery cell 116 can include multiple temperature sensors 118, such as having temperature sensors located at terminals between cells. In particular examples, the temperature sensors 118 can be used to determine an average rack temperature or a temperature spread within a rack 112, where aggregated temperature values for various racks in the enclosure 108 can be used in disclosed active fan balancing techniques.

A given battery rack 112 can include other components, as shown for battery rack 112*b*, which can also be representative of the other battery racks. In particular, the battery rack 112*b* is shown as including a fan 122. Although a single fan 122 is shown, in practice a given battery rack 112 can include multiple fans. When multiple fans 122 are included, the fans for a given battery rack 112 can be controlled as a unit (in other words, all fans can be turned on or off according to a control signal) or individual rack fans or subsets of rack fans can be controlled separately. In some cases, battery rack fans 122 can be integral to the battery rack, while in other cases the battery rack fans can be separate from, but typically proximate to, a battery rack to be temperature regulated by a respective battery rack fan. For example, the battery racks 112 and the battery rack fans 122 can be mounted separately within the enclosure 108, including where the battery rack fans are included in the enclosure during manufacture, and where the battery racks can be installed later/as separate components.

Although a single battery rack 112 is shown with a single battery rack fan 122 (which can represent a set of fans), in other cases a single battery rack fan can be responsible for ventilating multiple battery racks 112. In this case, techniques of the present disclosure can be suitably adapted, such as by considering a set of battery racks 112 as a unit in described algorithms having calculations that are stated to be performed for a single battery rack.

The battery rack 112*b* is shown as including a sensor 124, which can be a temperature sensor. The temperature sensor 124 can be included along with, or in place of, the temperature sensors 118 shown for the battery rack 112*a*. Although a single temperature sensor 124 is shown, the battery rack 112*b* can include multiple temperature sensors if desired. In other cases, a battery rack 112 can omit a temperature sensor 124.

The temperature sensors 118, 124 can provide information, such as temperature readings, to a processor 128 of the battery rack 112*b*. The processor 128 can in turn send temperature information to other components of the energy storage unit 100, or to components outside of the energy storage unit 100 that can be used to manage operation of the energy storage unit, including a remote workstation that can be used to monitor and manage multiple energy storage units.

In turn, the processor 128 can receive commands from other components of the energy storage unit 100 or from outside of the energy storage unit. In particular, the processor 128 can receive commands to adjust an operational state of the battery rack fans 122, such as commands to turn the fan on or turn the fan off.

It is typically desirable to provide ventilation to help regulate the temperature of the battery racks 112. The energy storage unit 100 can be used in a variety of operational scenarios, including in situations where the energy storage unit 100 experiences variable ambient temperatures, such as when an energy storage unit is placed in an outdoor location and can experience different temperatures depending on a time of day or season. It may be desirable to heat the battery racks 112 if they become too cold, or to cool the battery racks if they become too hot. Temperatures within the enclosure 108 can also vary depending on the operational status of the battery racks 112, such as if the temperature increases as cells within the battery racks are charged or discharged.

Because of the arrangement of the battery racks 112 within the enclosure 108, some battery racks may be hotter or cooler than other battery racks, either based on their operational status or the operational status of battery racks proximate a given battery rack, or based on their location within the enclosure. Accordingly, simply activating or deactivating the battery rack fans 122 of all of the battery racks 112 in the enclosure can provide suboptimal results. For example, battery racks 112 that have an acceptable operating temperature may be cooled or heated, which can cause the battery racks to have an unacceptable operating temperature, or to have an undesirable temperature spread between different racks in the enclosure 108. In addition, cycling the battery rack fans 122 monolithically can consume excess energy and can cause premature wear or failure of the battery rack fans.

Disclosed techniques can address these issues by monitoring the temperature of individual battery racks 112, and based on an analysis of temperature data from multiple battery racks selecting a subset of battery rack fans 122 to turn on and off. The battery rack fans 122 can thus be actively and dynamically balanced to maintain battery racks 112 at a desired temperature or temperature range as the temperatures of the battery racks, including with respect to one or more measured temperatures for the enclosure 108, vary over time.

Typically, the enclosure 108 and the arrangement of the battery racks 112 within the enclosure are configured to provide fluid passageways that can be used to help ventilate the battery racks in order to help regulate their temperatures. The enclosure 108 is shown as including a central duct 140 about which the battery racks 112 are arranged. The central duct 140 extends through the enclosure 108 at opposing ends of the enclosure.

The central duct 140 is shown as in communication with HVAC units 144. Although two HVAC units 144 are shown, in practice a single HVAC unit can be used, or more than two HVAC units can be present. Similarly, although a single fluid passageway (the duct 140) is shown, the enclosure 108 can include multiple fluid passageways, the location and configuration of which can vary. Although shown and described as HVAC units 144, in practice a component can be used that provides less than all functionality of an HVAC unit, such as performing one or more of heating, ventilation, and air conditioning. In yet a further embodiment, the energy storage unit 100 can omit HVAC units 144, and temperature can be regulated by the battery rack fans 122.

As shown, an HVAC unit 144 includes a heating component 146, a cooling component, 148, and ventilation component 150 (such as a fan). An HVAC unit 144 can also include a temperature sensor 152, which can be used to measure a temperature of the enclosure 108, or of air passing through the central duct 140 (which also can be used to represent the temperature of the enclosure). Optionally, the enclosure 108 can include one or more temperature sensors 158 and one or more locations within the enclosure (or optionally on the exterior of the enclosure).

An HVAC unit 144 is also shown as including a processor 154. The processor 154 can optionally be in communication with the processors 128 of the battery racks 112. As described for the processors 128, the processor 154 can be in communication with a processor external to the enclosure 108, such as at a remote workstation. In a further embodiment, the processors 128 or the processor 154 can be in communication with a processor 162 of the energy storage unit 100. The processor 162, or another processor associated with or in communication with the energy storage unit 100, can be used to implement disclosed active fan balancing techniques, including controlling operational modes of the HVAC units, and controlling the battery rack fans 122.

Example 3—Example Technique for Controlling HVAC Unit

Active fan balancing techniques can be used alone or in conjunction with different operational modes of an HVAC unit. For example, temperature data for an enclosure or for one or more battery racks within the enclosure can be evaluated to determine whether the enclosure/racks are too hot, in which case cooling should be applied, or too cold, in which case heating should be applied. An HVAC unit can also be in an idle state, where it is not operational and battery rack fans are used to regulate rack temperatures. An idle state can also represent a scenario where a fan of the HVAC unit operates, along with rack fans, but where heating or cooling is not applied—the HVAC unit is in a ventilation only mode. Regardless of the operational mode of the HVAC unit, battery rack fans can be activated and balanced to help distribute air, included heated or cooled air, within the enclosure and about particular battery racks located therein.

Figure 2:
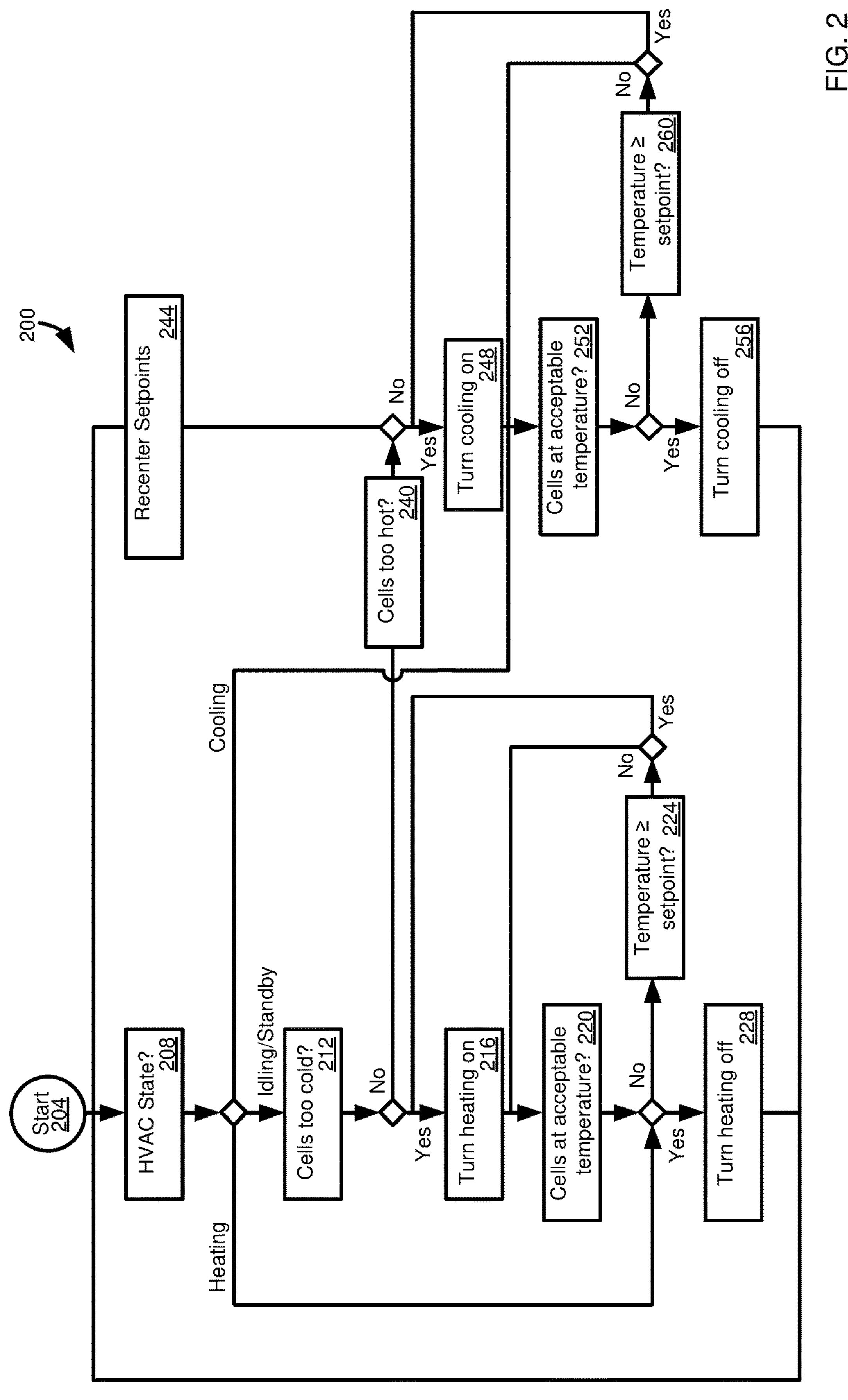
FIG. 2 is a flowchart of a process of controlling the operational mode of an HVAC unit of an energy storage unit.

FIG. 2 illustrates a process 200 for HVAC units in communication with an enclosure housing multiple battery racks. The process 200 starts at 204. A state of one or more HVAC units is determined at 208. As described above, HVAC units can represent heating, cooling, or ventilation units (for example, fans), located at, or proximate, an intake or outtake of an enclosure, as opposed to rack fans, which are located inside the enclosure in proximity to a respective battery rack.

If it is determined at 208 that an HVAC unit is in an idling state, the process 200 can proceed to 212, where it is determined whether the rack cells are colder than a particular threshold. If the rack cells are determined to be colder than the threshold, a cell heating override can be turned on, and a heating mode for the HVAC unit can be turned on at 216. Periodically, after the heating mode is turned on at 216, or if it is determined at 208 that the HVAC state is in a heating mode, it is determined at 220 whether the cells are back within a set of "normal" operating temperatures. If not, it is determined at 224 whether the ambient temperature is greater than or equal to a heating setpoint. If not, the process 200 can return to 220. If it is determined at 224 that the ambient temperature is less than the setpoint, the process 200 can return to 216 where the amount of heating, or heating parameters, such as the ambient set point, can be adjusted.

If it is determined at 220 that the cells are back to normal operating temperatures, the heating mode can be turned off at 228, which can include turning a heating override off. The process 200 can then return to 204.

If it is determined at 212 that the rack cells are not colder than the threshold, the process 200 can proceed to 240, where it is determined whether the rack cells are hotter than a particular threshold. If it is determined at 240 that the cells are not too hot, the process 200 can proceed to 244, where optionally a heating or cooling setpoint can be adjusted around a current ambient temperature, optionally within defined limits.

If it is determined at 240 that the rack cells are too hot, a cooling mode for the HVAC unit can be turned on at 248, which can include turning on a cooling override. At 252, it is determined whether the rack cells are back to a "normal" temperature, where the temperature can be the same as, or different than, the temperature used at 220. The process 200 also proceeds to 252 if it was determined at 208 that the HVAC unit was in a cooling mode.

If it is determined at 252 that the rack cells are back to a normal temperature, the cooling mode for the HVAC unit can be turned off at 256, which can include turning off a cooling override. The process 200 can then return to 204.

If it is determined at 252 that the rack cells are not back to a normal temperature, it can be determined at 260 whether an ambient temperature is less than or equal to a setpoint. If not, the process 200 can return to 252. If it is determined at 260 that the ambient temperature exceeds the set point, the process can return to 248, where the cooling, or cooling parameters, such as the ambient setpoint, can be adjusted.

In a particular embodiment of the process 200, the following variables can be used:

- amb_temp—ambient temperature in enclosure
- avg_cell_temp—average cell temperature in enclosure, which can include a random factor added to a measured temperature
- amb_H_SP—heating setpoint that controls heading mode of HVAC unit
- amb_C_SP—cooling setpoint that controls cooling mode of HVAC unit
- desiredHeatSP—desired heating setpoint to be implemented in an enclosure. In a particular implementation, this variable can be calculated as OccClgSetpt1—Heating Setpoint Diff
- OccClgSetpt1—enclosure logic register for setting the cooling setpoint
- Heating Setpoint Diff—enclosure logic register for setting the "cooling minus heating setpoint" differential. Typically set at a default value.
- setPointAdjustment—configurable parameter for re-setting step sizes
- centerParams—configurable parameter for resetting step sizes
- minHeatSetPoint—configurable parameter for lowest allowed Heating Setpoint when cells are in acceptable temperature range
- maxHeatSetPoint—configurable parameter for highest allowed Heating Setpoint when process is in heating override
- minCoolSetPoint—configurable parameter for lowest allowed cooling setpoint when in cooling override
- maxCooletPoint—configurable parameter for highest allowed cooling setpoint when cells are in acceptable temperature range
- defaultCoolSetPoint—configurable parameter for default cooling setpoint
- defaultHeatSetPoint—configurable parameter for default heating setpoint
- defaultSPDiff—configurable parameter for default "Diff" setpoint (Heating Setpoint Diff)

Figure 3:
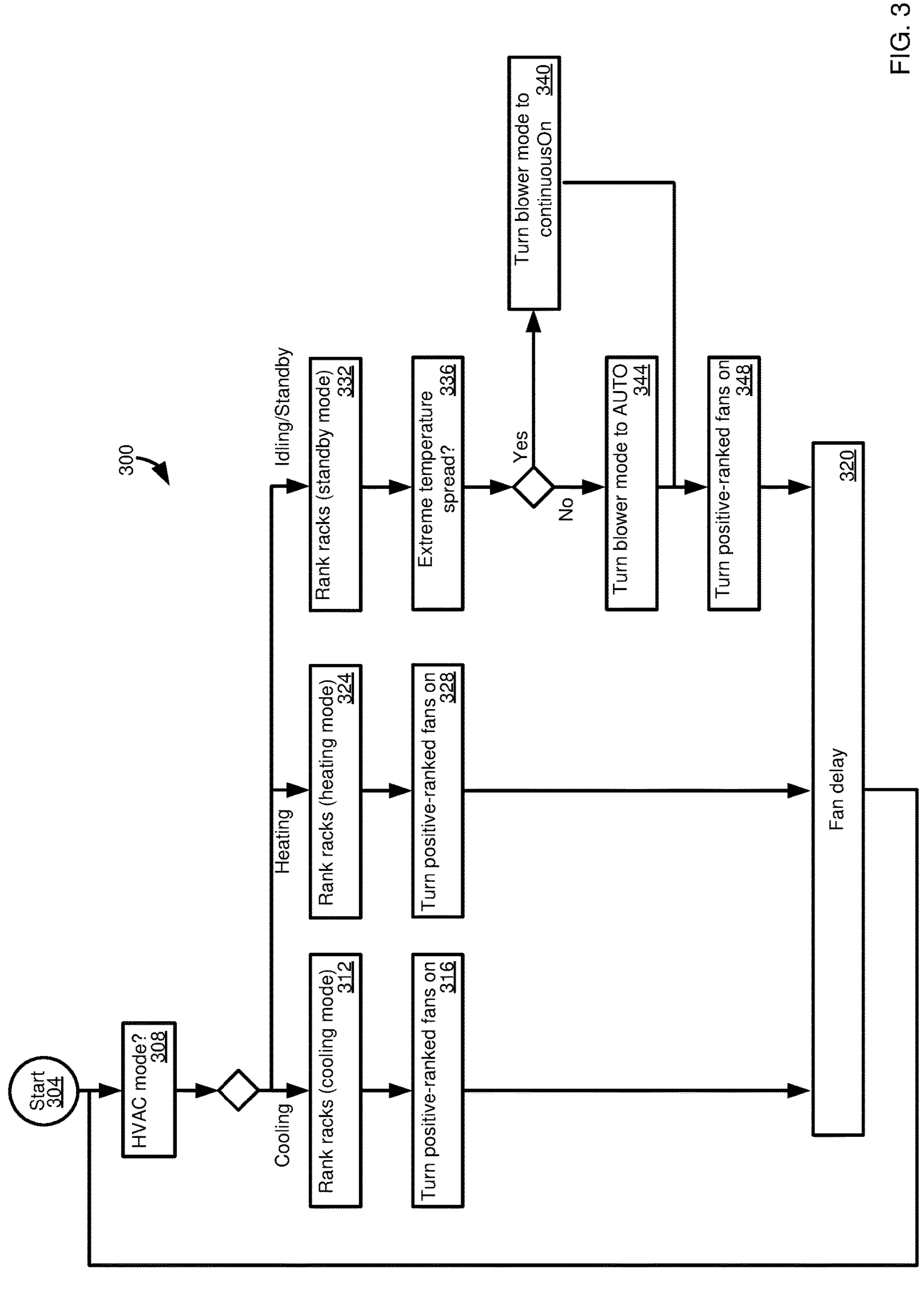
FIG. 3 is a flowchart of a process for activating battery rack fans in a disclosed active fan balancing technique.

Input parameters (temperature) can be smoothed, such as using exponential smoothing, both in the process 200 and an active fan balancing process 300 of FIG. 3, described in Example 4. Smoothing can help avoid responding to fast spikes in data that do not truly reflect a system's state, and which might trigger heating or cooling when such action may not be warranted. An example of an exponential smoothing technique that can be used is:

$$smoothed\_temp_0 = sensor\_temp_0$$

$$smoothed\_temp_t = sensor\_temp_t * alpha + (1 - alpha) * smoothed\_temp_{t-1}$$

where alpha is a configurable smoothing parameter.

For the process 200, the above variables can be applied to various process steps. For example, at 208, an idling HVAC state can be indicated for the HVAC unit by amb_H_SP<=amb_temp<=amb_C_CP, or for the enclosure logic by cHeatSP<=avg_cell_temp<=cCoolSP. For operation of the HVAC heating mode at 216, the ambient heating setpoint can be calculated as min[amb_temp+setPointAdjustment, maxHeatSetPoint], and the ambient cooling setpoint can be calculated as amb_H_SP+centerParams*2. For the enclosure logic, the desiredHeatSP can be calculated as min[avg_cell_temp+setPointAdjustment, MaxHeatSetpoint], and a value for the enclosure logic register can be calculated as deasiredHeatSP+Heating SetPoint Diff.

For calculations at 224, for the enclosure, the logic can be avg_cell_temp>=(OccClgSetpt1−Heating Setpoint Diff), while for the HVAC unit the logic can be amb_temp>=amb_H_SP. For calculations at 228, for the HVAC unit, updated setpoints can be calculated as amb_H_SP=amb_temp+setPointAdjustment and amb_C_SP=amb_H_SP+centerParams*2. The enclosure setpoint can be calculated as OccClgSetpt1=defaultCoolingSP.

For calculations at 244, for the enclosure, the OccClgSetpt1 variable can be set equal to defaultCoolingSP. For the HVAC unit, amb_H_SP can be set as min[max[minHeatSetPoint, amb_temp−centerParams], maxCoolSetPoint−centerParams*2]. The ambC_SP variable can be calculated as amb_H_SP+centerParams*2.

For the calculations at 248, for the HVAC unit, amb_C_SP can be calculated as max[amb_temp−setPointAdjustment, minCoolsetPoint] and amb_H_SP can be calculated as amb_C_SP−centerParams*2. For the enclosure, OccClgSetpt1 can be calculated as max[avg_cell_temp−setPointAdjustment, minCoolSetPoint].

For calculations at 256, for the HVAC unit, amb_C_SP can be calculated as amb_temp+setPointAdjustment, and amb_H_SP can be calculated as amb_C_SP−centerParams*2. For the enclosure, OccClgSetpt1 can be set to the default cooling setpoint. For the calculations at 260, for the HVAC unit, it can be determined whether amb_temp is less than or equal to amb_C_SP, and for the enclosure it can be determined whether avg_cell_temp is less than or equal to OccClgSetpt1.

The operations at 212, 220, 240, and 252 are associated with various conditions. For the condition at 240, the condition is used to determine if the enclosure needs cooling. In particular, if the average and median cell rack temperatures are too high, or if any enclosures have deviated too far above a group average temperature, or if the sum of the average and standard deviation of the cell rack temperatures has exceeded a maximum cell setpoint, it may be desirable to apply cooling to an enclosure. For the controlling of an HVAC unit, decreasing the cooling and heating setpoints, which respond to ambient temperatures, trigger the HVAC unit to enter a cooling mode.

Example Boolean logic is:

```
(CoolOverride) or (EncAvgCellTemp>BatCoolSP
    and EncMedCellTemp>BatCoolSP) or
    (EncAvgCellTemp>GrpAvgCellTemp+
    GrpStDev*StdDevs and
    GrpAvgCellTemp>BatHeatSP+HystAdj) or
    (EncMaxCellTemp>MaxCellSP and
    EncMinCellTemp>MinCellSP+HystAdj)
```

where variables used are defined as:

EncAvgCellTemp—the measured average temperature of all cells in the enclosure.

EncMedCellTemp—the measured median temperature of all cells in the enclosure.

EncMaxCellTemp—the measured maximum temperature of all cells in the enclosure.

EncMinCellTemp—the measured minimum temperature of all cells in the enclosure.

EncStDev—the measured standard deviation of all cells in the enclosure.

GrpAvgCellTemp—the measured average cell temperature for a "group", which is a sublist of enclosures (but can be set to EncAvgCellTemp by default).

GrpStdDev is the measured standard deviation of all rack average temperatures in a group. Note that this is the standard deviation of (rack 1 avg temp, rack 2 avg temp, . . . ) for all racks in a group. This calculation can be more performant than calculating the standard deviation of all cell temperatures within a group.

·StdDevs—the configurable multiplier for how many standard deviations will be tolerated for the difference between individual enclosure temperatures and group average temperatures. In this case, it is being determined whether an enclosure average cell temperature is more than StdDevs*EncStdDev above the group average cell temperature, in other words, whether an individual enclosure's racks are getting too hot.

BatCoolSP—the setpoint for the maximum enclosure median temperature—that is, when median or average cell temperatures go above this setpoint, the racks are cooled.

BatHeatSP—the setpoint for the minimum enclosure median temperature—that is, when median or average cell temperatures go below this setpoint, the racks are heated. In this case, is it being checked to ensure that the group average cell temperature is not too low (if the group average cell temperature was very low, there might be a single rack (or cells or cells thereof) that had gone too far above the group average, but it might be at a normal temperature). In other words, the setpoint can be used to avoid cooling racks that are already cold, because one enclosure is hotter than the rest.

MaxCellSP—the setpoint for the maximum cell temperature inside an enclosure—that is, it may be desired to cool the racks when an individual cell temperature goes above this setpoint.

MinCellSP—the setpoint for the minimum cell temperature inside an enclosure—that is, it may be desired to heat the racks when an individual cell temperature goes below this setpoint. In this case, the process 200 can determine (a) whether there are any cells that have gone above the maximum allowable temperature, and (b) checking that there are no cells that are below the minimum temperature, to avoid cooling cells that are already too cold.

HystAdj—the configurable adjustment for hysteresis to prevent over-cycling between Cooling and Heating states.

For the condition at 212, the condition is used to determine whether the enclosure should be heated. The cooling and heating setpoints of the HVAC unit can be increased, and since they respond to ambient temperature, adjustment of the setpoints should result in triggering of a heating component. In particular, heating can be initiated if average or median rack temperatures are too low, or if any enclosures have deviated too far below a group average, or if the difference between the average and standard deviation of the rack temperatures drops below the minimum rack setpoint.

Example Boolean logic for determining whether heating should be applied is:

```
(HeatOverride) or (EncAvgCellTemp<BatHeatSP and
    EncMedCellTemp<BatHeatSP) or
    (EncAvgCellTemp<GrpAvgCellTemp−
    GrpStdDev*StdDevs and
    GrpAvgCellTemp<BatCoolSP−HystAdj) or
    (EncMinCellTemp<MinCellSP and
    EncMaxCellTemp<MaxCellSP−HystAdj)
```

where the variables can be as described above. In the conditions with the StdDevs, it is determined whether an enclosure average cell temperature is more than StdDev*EnclStdDev below the group average cell temperature, checking whether the racks of an individual enclosure are getting too cold. In the BatCoolSP condition, it is checked the group average cell temperature is not too high. If the group average cell temperature is very high, there might be a single enclosure that was far below the group average temperature, where the group average temperature may still be normal. This condition helps ensure that racks are not heated just because a single enclosure is cooler than the rest.

For the logic 252, it is checked whether the cells have been cooled to an acceptable temperature range, at which point cooling can be discontinued, and the HVAC unit can return to an idling state. Example Boolean logic, where the variables are as described above, is:

```
(EncAvgCellTemp<=BatCoolSP−HystAdj or
    EncMedCellTemp<=BatCoolSP−HystAdj) and
    (EncAvgCellTemp<=GrpAvgCellTemp+
    GrpStdDev*StdDevs) and
    (EncMaxCellTemp<=MaxCellSP−HystAdj)
```

In the first condition group, it is checked whether the average or median temperature is below the BatCoolSP−HystAdj. That is, whether the average or median cell temperatures are below the acceptable high range values. In the second condition group, it is checked whether the average enclosure temperature is within a half of a standard deviation above the group average cell temperatures. In other words, it is checked that there are not enclosures that are "outliers" above the group average temperature.

For the logic 220, a condition is used to determine whether cells have been heated to an acceptable temperature, in which case heating can be discontinued and the HVAC unit can return to an idling state. Example Boolean logic for this condition, where the variables are as described above, is:

(EncAvgCellTemp>=BatHeatSP+HystAdj or EncMedCellTemp>=BatHeatSP+HystAdj) and (EncAvgCellTemp>=GrpAvgCellTemp−GrpStdDev*StdDevs) and (EncAvgCellTemp−EncStDev>=MinCellSP+HystAdj)

For the first condition group, it is determined whether the average or median enclosure temperature has exceeded BatHeatSP+HystAdj. In other words, it is determined whether average or median cell temperatures are above the acceptable low range values. For the second condition group, it is determined whether the average enclosure temperature is within a half standard deviation below the group average cell temperatures (whether there are enclosures that are "outliers" below the group average temperature).

Certain operations in the process 200 involve overriding heating or cooling settings for one or more HVAC units of an enclosure. It should be appreciated that certain disclosed active fan balancing techniques can be used in the absence of HVAC heating or cooling overrides for one or more HVAC units of an enclosure. In another example, an installation can include multiple enclosures, and overrides can be selectively activated for a portion of the enclosures.

Example 4—Example Technique for Controlling Battery Rack Fans

FIG. 3 illustrates a process 300 where active fan balancing techniques can be combined with HVAC operations, including when a blower motor of the HVAC unit is activated in conjunction with fans associated with individual racks, and where the HVAC unit can be in a cooling, heating, or idling (or standby) state.

The process 300 begins at 304. At 308, it is determined what mode an HVAC unit is operating in. If it is determined at 308 that the HVAC unit is in a cooling mode, states of the rack fans are determined and ranked at 312 according to an algorithm used for a cooling mode. Positively ranked rack fans are turned on at 316. A delay period, such as fifteen seconds, is optionally applied to the battery rack fans at 320, after which the process 300 returns to 304.

As will be further explained, the fan delay results in fans maintaining an ON or OFF state for a period of time to reduce cycling of fans between these states, which can affect the longevity of the fans. For example, once a fan is turned on, it may be set to remain in the ON state for the fan delay period even after later ranking evaluations would result in the fan being in an OFF state. If a ranking determination then indicates that a fan should be turned off, it then remains in the OFF state until the fan delay period expires. A fan delay is not applied to fans that are not turned on or off as a result of a particular ranking calculation, but a prior delay status remains until such previously applied fan delay expires.

If it is determined at 308 that the HVAC unit is in a heating mode, states of the rack fans are ranked at 324 using an algorithm for a heating mode. Positively ranked rack fans are turned on at 328, after which the process 300 applies any fan delay periods at 320.

If it is determined at 308 that the HVAC unit is in a standby mode, states of the rack fans are ranked at 332 using an algorithm for a standby mode. At 336, it is determined if the states of the rack fans indicate that a temperature spread exceeds a threshold. If the threshold is exceeded, the blower motor of the HVAC unit is turned to "continuous on" at 340, and then positively ranked rack fans are turned on at 344. If the threshold is not exceeded, the blower motor of the HVAC unit is set to automatic at 348, and then positively ranked rack fans are turned on at 344. After 344, the process 300 applied any fan delay at 320.

Example 5—Example Technique for Ranking Battery Racks

Figure 4A:
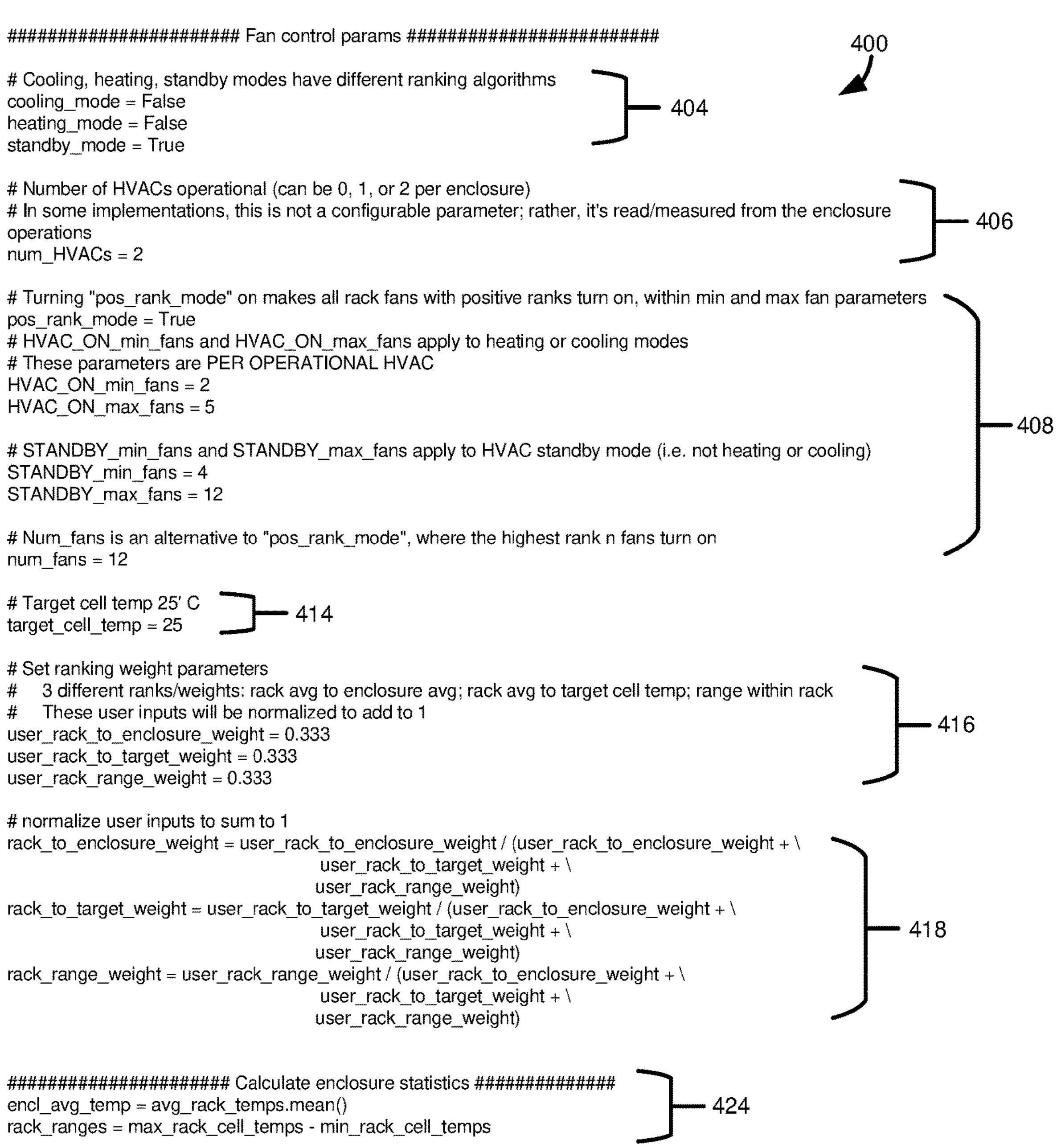

FIGS. 4A, 4B, and 4D illustrate pseudocode 400 that can be used to determine rack rankings for use in disclosed active fan balancing techniques. As described with respect to the processes 200 and 300 of FIGS. 2 and 3, an enclosure can have one or more HVAC units that can be in a cooling mode, a heating mode, or a standby mode. Different rack ranking algorithms can be used in conjunction with these modes, as explained with respect to the process 300. Turning first to FIG. 4A, lines 404 of the code 400 reflect the different operational modes, including showing Boolean variables representing whether a particular mode is active. In at least some cases, a standby mode can be set to TRUE by default, with the other modes set to FALSE.

Lines 406 of the code reflect that a given enclosure can have zero or more HVAC units. In the case of an enclosure with no HVAC units, the rack fans can be ranked using the standby algorithm.

Typically, an enclosure will have multiple battery racks, with associated battery rack fans, including fans that are integral to a battery rack (that is, the rack is a unit that includes multiple battery cells and one or more fans). If desired, limits can be set for a maximum or minimum number of battery rack fans to be activated when temperature adjustment of the enclosure is desired. As indicated by lines 408 of the code, maximum and minimum values can be set globally or set for specific HVAC operational modes—heating, cooling, or standby. In the particular example of the pseudocode 400, one set of maximum/minimum fan values is set for when the HVAC unit is in either a heating or cooling mode, and another set of maximum/minimum values is set for when the HVAC unit is in a standby mode. In other cases, a static number of fans can be specified, as indicated by the "num_fans" parameters. Code line 414 sets a target cell temperature.

A variety of parameters can be used in calculating fan rankings for use in active fan balancing techniques. In particular, the parameters can include a parameter, "rack_to_enclosure," which compares a rack average temperature with an average rack temperature for an enclosure that includes the rack, a parameter, "rack_to_target," which compares the rack average temperature with the target cell temperature (specified in code line 414), and a parameter, "rack_range," which accounts for a temperature range for battery cells within a battery rack. During operation, values for these parameters can be obtained from sensors associated with an enclosure, battery rack, or particular cells of a particular battery rack. As indicated by code lines 416, these parameters can be weighted. As shown, the parameters are equally weighted. However, other weightings can be used, including based on empirical testing of different weighting parameters to determine a set of weights that produces good results for a particular use scenario.

It can be beneficial to use normalized values for the different fan ranking parameters discussed above. Code lines 418 perform this functionality, where a value for each parameter is divided by the sum of all three parameters.

Code lines 424 illustrates how values for other parameters used in ranking calculations can be obtained, in particular values associated with temperature measurements for an enclosure. An average rack temperature is obtained by calling a function that calculates an average of all of the rack temperatures for racks in the enclosure. A range of rack temperatures is calculated as the difference between the maximum rack cell temperatures and the minimum rack cell temperatures for cells within a given battery rack.

The pseudocode 400 continues in FIG. 4B, where the illustrated pseudocode provides ranking algorithms for various HVAC operating modes, including a ranking algorithm 430 for a cooling mode, a ranking algorithm 432 for a heating mode, and a ranking algorithm 434 for a standby mode.

Battery rack ranking values are calculated in code lines 440. Battery rack ranking values are calculated for the parameters discussed with respect to the code lines 416. In particular, the parameter, "rack_to_enclosure," which compares a particular battery rack temperature to the average battery rack temperature for the enclosure, is calculated as the difference between the average battery rack temperature and a given battery rack temperature divided by the absolute value of a battery rack having the largest deviation from the average battery rack temperature of the enclosure.

Figure 6A:
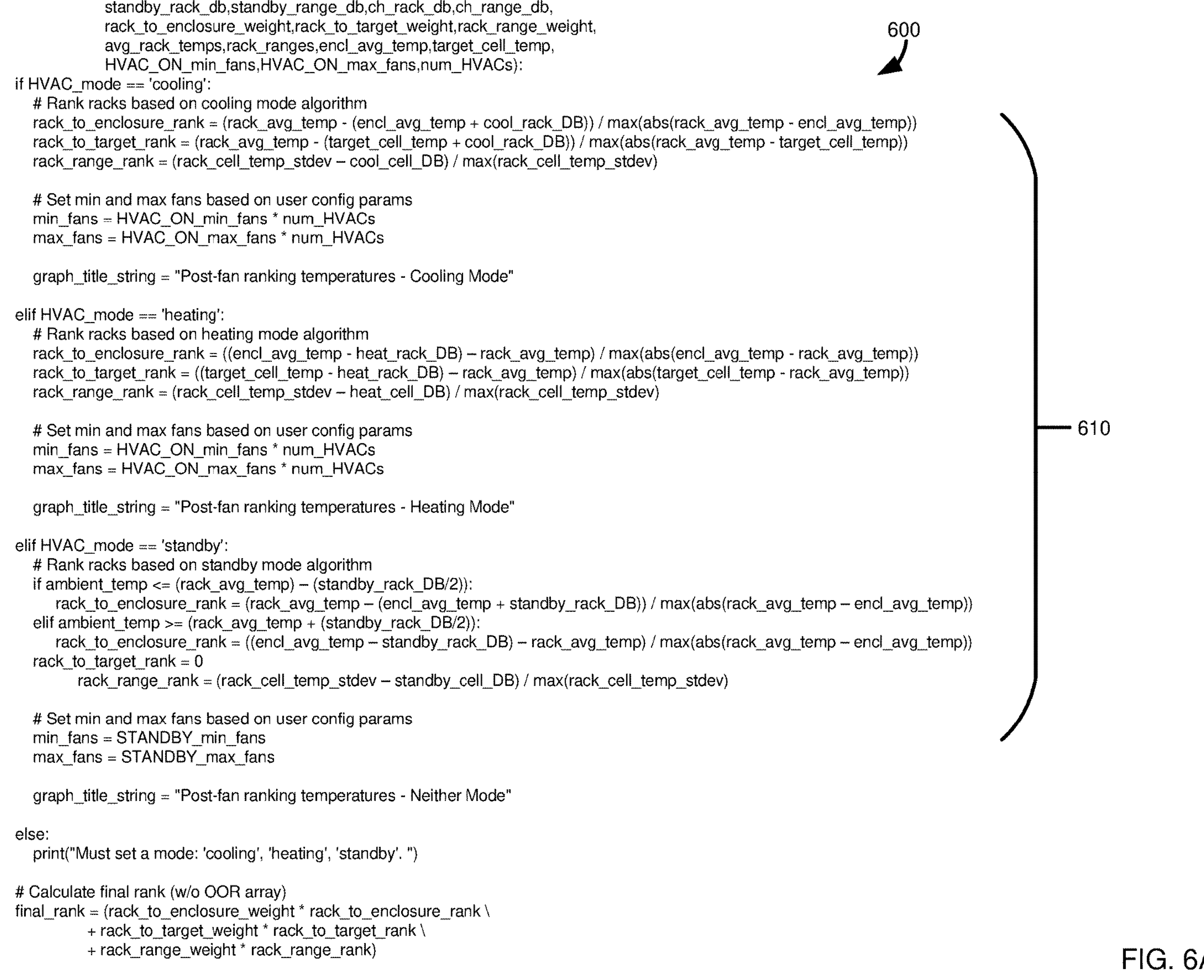

In a similar manner, the parameter, "rack_to_target," which compares battery rack temperatures with a target cell temperature, is calculated as the difference between the temperature of a given battery rack and the target cell temperature divided by the absolute value of the result for the battery rack having the greatest variation between the battery rack temperature and the target cell temperature. For the parameter, "rack_range," which measures a difference between the hottest and coldest cells of a particular battery rack, the rank of a particular battery rack is calculated as the difference between the hottest and coldest cells for a given battery rack divided by the value for the battery rack having the largest temperature difference between its hottest and coldest cells (as shown in FIG. 6A).

Battery racks can be ranked based on the individual parameters discussed for the code lines 440. As described above, the individual parameter values (rack_to_enclosure, rack_to_target, rack_range) can be weighted, and so an overall score for an individual battery rack can be calculated as the weighted sum of its parameter values. The battery racks can then be ranked (ordered) according to these weighted sums. In particular implementations of disclosed techniques, these rankings are used to determine which battery racks have a greatest need for temperature adjustment (for example, being too hot or too cold), and fans for highest ranked battery racks can be turned on, within any maximum or minimum numbers of fans that have been set for a particular HVAC operational mode, as indicated at code lines 444.

If desired, battery rack information, optionally including ranking information, can be output for display, in addition to being used to automatically balance activated fans based on the temperatures of individual battery racks. Code lines 446 plot ranking information for individual battery racks. An example plot is provided in FIG. 4C.

Figure 4C:
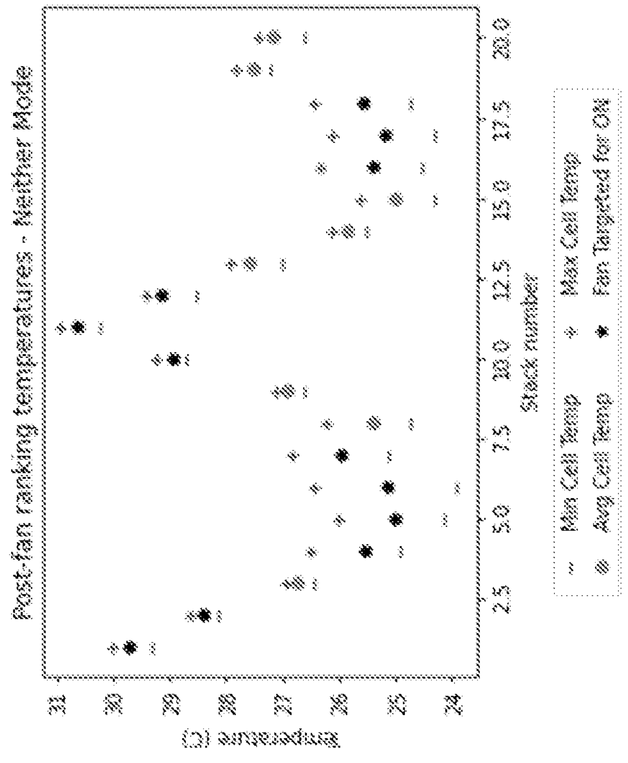
FIG. 4C is an example plot of data determined using such techniques.

As shown in FIG. 4C, the graph has axes of temperature (Y) and rack number (X). For each rack, the minimum and maximum cell temperatures of the battery rack are illustrated, along with the average cell temperature and an indication of whether one or more fans associated with a given battery rack have been activated based on the particular ranking calculation being considered.

In the plot, it can be seen that battery racks whose fans have been activated according to the algorithm 440 are those having a largest difference from a target average cell temperature (such as battery rack 11) or where there is a significant difference between the hottest and coldest cells in the battery rack (such as battery rack 6). As described earlier, racks with a largest difference from an average battery rack temperature for the enclosure will also be ranked higher, and more likely to be identified for fan activation.

Returning to FIG. 4B, and code lines 432 for the algorithm used when the HVAC unit is in a heating mode, the various ranking parameters are calculated in code lines 454. Note that the algorithms used to calculate the ranking values in the code lines 454 differ from those in the code lines 440 when the HVAC unit is in a cooling mode. In general, the algorithmic differences arise from wanting to identify hotter battery racks/rack cells when the HVAC unit is in a cooling mode, and wanting to identify colder battery racks/rack cells when the HVAC unit is in a heating mode.

The "rack_to_enclosure" parameter is calculated as the difference between the average battery rack temperature for the enclosure and the average temperature for a given battery rack divided by the absolute value of a battery rack having the largest deviation from the average battery rack temperature of the enclosure.

The "rack_to_target" parameter is calculated as the difference between the target cell temperature and the average battery rack temperature of a given battery rack divided by the absolute value of the result for the battery rack having the greatest variation between the rack temperature and the target cell temperature, but measured as the difference between the target cell temperature and the average cell temperature of a battery rack, rather than the difference between the average cell temperature and the target cell temperature, as for the cooling mode. The "rack_range" parameter is calculated identically as for the cooling mode, since the goal is to rank battery tacks according to their cell temperature spread.

Battery rack fans can be activated based on a set number of fans or a number maximum and minimum number of fans for the heating mode at code lines 456, in a similar manner as for the cooling mode. Similarly, code lines 458 generate a plot of rack information, including identifying racks whose fans were indicated as to be activated according to the algorithm of code lines 432. The plot can otherwise be similar to the plot of FIG. 4C.

Code lines 464 for calculating parameters for the standby algorithm are analogous to the code lines 440 used for the heating mode. However, the actual results, in terms of fan activation, can differ between cooling and standby modes, as different numbers or ranges of battery rack fans can be specified in code lines 466 for the standby mode compared with values provided in code lines 444 for the cooling mode.

In some cases, it may be desirable to use a smaller number of fans when the HVAC unit is in a standby mode, since that can be an indication that the enclosure is generally in a desirable state, as opposed to when heating or cooling is applied, which can indicate that overall the battery racks in the enclosure are too hot or too cold. However, in other cases it can be desirable to increase a number of active battery rack fans used in standby mode as compared with cooling, as doing so can help the enclosure from reaching a state where the HVAC unit is activated to applying heating or cooling.

Code lines 468 generate a plot of rack information, in a similar manner as described for when the HVAC unit is in a cooling or heating mode.

The portion of the code 400 in FIG. 4D illustrates how final ranking values for the battery racks can be provided and used to determine what battery rack fans should be turned on. When battery racks are ranked, a ranking value can be positive or negative. Typically, it is desirable to turn on most fans for the positively ranked battery racks. However, in some cases a number of positively ranked battery racks can exceed a maximum number of fans, in which case fans for positively ranked battery racks are turned on according to their priority, up to a maximum number of fans. When a number of positively ranked battery racks is less than a minimum number of fans, fans for negatively ranked battery racks can also be used to reach the minimum number, again with higher ranked (less negative) battery racks being selected for fan activation. If the number of positively ranked battery racks is within maximum and minimum fan thresholds, fans for positively ranked battery racks can be turned on (while fans for negatively ranked battery racks are not turned on according to the algorithm).

Example 6—Example Battery Rack Ranking Considering Out of Rotation Battery Racks Various changes, including refinements, can be made to the active fan balancing techniques described above, including in Examples 4 and 5. One refinement is indicating racks as out of rotation for active fan calculations. An out of rotation rack can be a rack that is offline, such as because it is awaiting service or maintenance. While an out of rotation rack can be disconnected from a DC bus connecting racks in an enclosure, it is still in the enclosure. It can be beneficial to treat in rotation racks, that generate heat during operation, differently from out of rotation racks.

In particular implementations, out of rotation racks are ranked lower than in rotation racks. For example, since an HVAC unit may provide a limited amount of airflow to a central duct, it may be preferable to prioritize this airflow for in rotation racks that may benefit more from heating or cooling. However, leaving out of rotation racks in a ranking calculation can be beneficial as compared with simply omitting out of rotating racks from ranking operations, since it is typically desirable to avoid having out of rotation racks being hotter or colder than defined thresholds.

Taking a rack out of rotation can have one or more consequences, or be implemented in different ways. In one example, out of rotation racks are considered in the calculations described in Example 5, but the ranking of out of rotation racks is ignored. In another example, out of rotation of racks are not considered in calculations for a set of racks that are in rotation. In a further example, out of rotation racks are included in calculations, but are weighted lower than in-rotation racks.

In a particular example, a weight, such as 0.5, is set for out of rotation racks. When a ranking is calculated for all racks, out of rotation racks can be indicated in a bit vector by a value of “1,” the bit vector can be multiplied by the weighting factor, and then the resulting vector can be subtracted from the original ranking to produce a revised ranking. The weighting parameter can be adjusted, such as between values of zero and one, to have out of rotation racks have a greater or smaller effect on a ranking of in rotation racks. That is, values closer to one will result in out of rotation racks having a lower ranking, while values closer to zero can result in out of rotation racks having a final ranking closer to their original ranking.

As an example of how out of rotation rack information can be used, consider the example ranking results shown as a table 500 in FIG. 5. The table 500 includes multiple columns, including a column 510 that provides value used to rank racks and a column 512 that identifies a rack associated with a given row of the table, where the rows are in ranked order—note that the last row has the lowest value, and the first row has the largest value for column 510. Column 508 also identifies a given rack, but differs from the column 512 in that column 512 uses “1” for the first rack in a set of racks where column 508 uses “0” for a first rack in a set of racks.

Pseudocode 520 illustrates how the ranking values of the column 510 can be adjusted using an out of rotation weighting factor. Line 522 provides a bit vector indicating out of rotation racks, based on a status provided in a column 514 of the table 500. This bit vector is multiplied by the out of rotation weighting factor of line 524 to provide the array shown at line 526. The revised rankings are then calculated by subtracting the weighting array from an array formed from the original ranking values of column 510 to provide a final ranking array shown at line 528. It can be seen that the out of rotation racks have dropped significantly in the rankings as a result of the weighting.

Example 7—Example Technique Including a Fan Delay for Ranking Battery Racks

Another enhancement that can be made to active fan balancing algorithms is to introduce a fan delay. A fan delay can limit the duty cycle on rack fans, by helping them avoid starting or stopping too frequently. According to the technique, rack fans must have been in a current state, ON or OFF, for a threshold period of time before they can receive commands to change states. During an active balancing algorithm, a set of fans can be determined that must remain on, a set of fans can be determined that must remain off, and a set of fans can be determined that are able to change states.

Fans that must remain in an ON or OFF state can be considered in different manners when making determinations as to whether, or how many, configurable fans can be turned on during an evaluation using an active fan balancing algorithm. In particular, in some scenarios fans that must remain on are counted towards a maximum number of fans that can be on, while in other cases they are not (or, different parameters can be set for each scenario, such as having a maximum number of fans on and a maximum number of configurable fans that can be turned on). Similarly, depending on implementation, fans that must remain in an OFF state are or are not considered in calculations involving a minimum number of fans that are to be in an ON state.

In one example, if a number of positively ranked fans is greater than a difference between a maximum number of fans that can be active and a maximum number of fans that must be on (because of fan delay), positively ranks fans can be turned on, up to the maximum number of fans, as illustrated by the following pseudocode:

```
if (len(CONFIGURABLE[CONFIGURABLE[“Rack Rank”] >= 0]) >
(max_fans – len(MUST_ON)):
fans_on = CONFIGURABLE.sort_values(by=“Rack
Rank”,ascending=False).iloc[:(max_fans– len(MUST_ON))][:]
```

In the pseudocode, “status rank” refers to the rank of the racks, which in a particular example are ranked between −1 and 1. Racks having a rank value greater than zero can be considered positively ranked racks. “fans_on” is the set of configurable fans that will be turned on according to the ranking (and the maximum number of fans), while “MUS- T_ON" is the set of fans that must remain on because of they were in an ON state and their fan delay period has not yet expired.

In some cases, a fan delay parameter can be overridden if needed to reach a minimum number of active fans. For example, the fan delay can be overridden if the difference between the total number of fans within the enclosure and the number of fans that are set to an OFF state because of the fan delay is less than the minimum number of fans which are to be in an ON state. Example pseudocode for implementing this scenario is:

```
elif (total_racks − len(STAY_OFF)) < min_fans:
fans_on = CONFIGURABLE.sort_values(by="Rack
Rank",ascending=False).iloc[:(min_fans)][:]
```

In the pseudocode above STAY_OFF is the number of fans to be maintained in an OFF state because of the fan delay, where the len( ) function provides the number of fans in that set. If it is determined that not enough fans will be active to satisfy the minimum number of fans, fans in the STAY_OFF set can be turned on according to their ranking until the minimum number of fans is satisfied. In some cases, if a fan delay is overridden, that fan delay can be reset.

As further examples of how fans to be activated can be determined, consider a scenario where a set of positively ranked fans in the set of configurable fans is less than the difference between the minimum number of fans and the set of fans that are set to an ON state because the fan delay has not expired. Highest ranked fans within the set of configurable set of fans can be turned on until the minimum number of active fans is reached. In other words, fans other than positively ranked fans can be activated if needed to satisfy the minimum number of active fans. Example pseudocode to implement this feature is:

```
elif (len(CONFIGURABLE[CONFIGURABLE["Rack Rank"] >= 0]) <
(min_fans− len(MUST_ON)):
2 fans_on = CONFIGURABLE.sort_values(by="Rack
Rank",ascending=False).iloc[:(min_fans−len(MUST_ON))][:]
```

In the absence of any of the above conditions, fans within the set of configurable fans can be turned on within the maximum/minimum number of fans. In particular, positively ranked fans can be turned on as:

```
else:
fans_on = CONFIGURABLE[CONFIGURABLE["Rack Rank"] >= 0]
```

Example 8—Example Technique for Ranking Battery Rack Fans Including Dead Band Values Another refinement to active fan balancing algorithms is the use of dead bands. A dead band represents a temperature range about a setpoint in which fan activation (and optionally overall heating or cooling operations) will not take place. For example, consider a setpoint of 25 degrees Celsius where a dead band is defined as being two degrees below the setpoint to two degrees higher than the setpoint. So long as a measured temperature is within the range of 23-27 degrees, no status change will occur. If a status change occurs, action can be taken to reach the setpoint. In another implementation, dead bands can be defined with respect to a standard deviation of cell temperatures of cells within a particular rack, rather than using measured temperatures directly.

In general, dead bands can be defined for different HVAC operational modes, or two or more HVAC operational modes can share the same set of dead band values. In a particular example, the same set of dead band values is used for both heating and cooling, while a separate set of dead band values is used for a standby or idle mode. Dead band values can be defined for variables used in calculating the parameters described in FIG. 4A. In particular, dead band values can be defined for a cell (including for use in determining a range between hottest and coldest cells in a particular rack) and for racks (such as for use in determining a difference between a given rack and an average rack value for an enclosure or determining a difference between a given rack and a target rack (or cell) setpoint). The "cell" setpoint can also be referred to as a "range" dead band.

For ranking racks in a cooling mode, and accounting for dead bands, example calculations can be:

```
rack_to_enclosure_rank = (rack_avg_temp − (enc_avg_temp +
cool_rack_DB)) / max(abs(rack_avg_temp − encl_avg_temp))
rack_to_target_rank = (rack_avg_temp − (target_cell_temp +
cool_rack_DB)) / max(abs(rack_avg_temp − target_cell_temp)
rack_range_rank = (rack_cell_temp_stdev − cool_cell_DB) /
max(rack_cell_temp_stdev)
```

For ranking racks in a heating mode, and accounting for dead bands, example calculations can be:

```
rack_to_enclosure_rank = ((encl_avg_temp − heat_rack_DB_) −
rack_avg_temp) / max(abs(encl_avg_temp − rack_avg_temp))
rack_to_target_rank = ((target_cell_temp − heat_rack_DB) −
rack_avg_temp) / max(abs(target_cell_temp − rack_avg_temp))
rack_range_rank = (rack_cell_temp_stdev − heat_cell_DB) /
max(rack_cell_temp_stdev)
```

For ranking racks in an HVAC standby mode, and accounting for dead bands, example calculations can be:

```
if ambient_temp <= (rack_avg_temp − (standby_rack_DB/2)):
rack_to_enclosure_rank = (rack_avg_temp + standby_rack_DB) /
max(abs(rack_avg_temp − encl_avg_temp))
elif ambient_temp >= (rack_avg_temp + (standby_rack_DB/2)):
rack_to_enclosure_rank = ((encl_avg_temp − standby_rack_DB) −
rack_avg_temp_/ max(abs(rack_avg_temp − encl_avg_temp))
rack_to_target_rank = 0: rack_range_rank =
(rack_cell_temp_stdev − standby_cell_DB) /
max(rack_cell_temp_stdev)
```

Figure 6C:
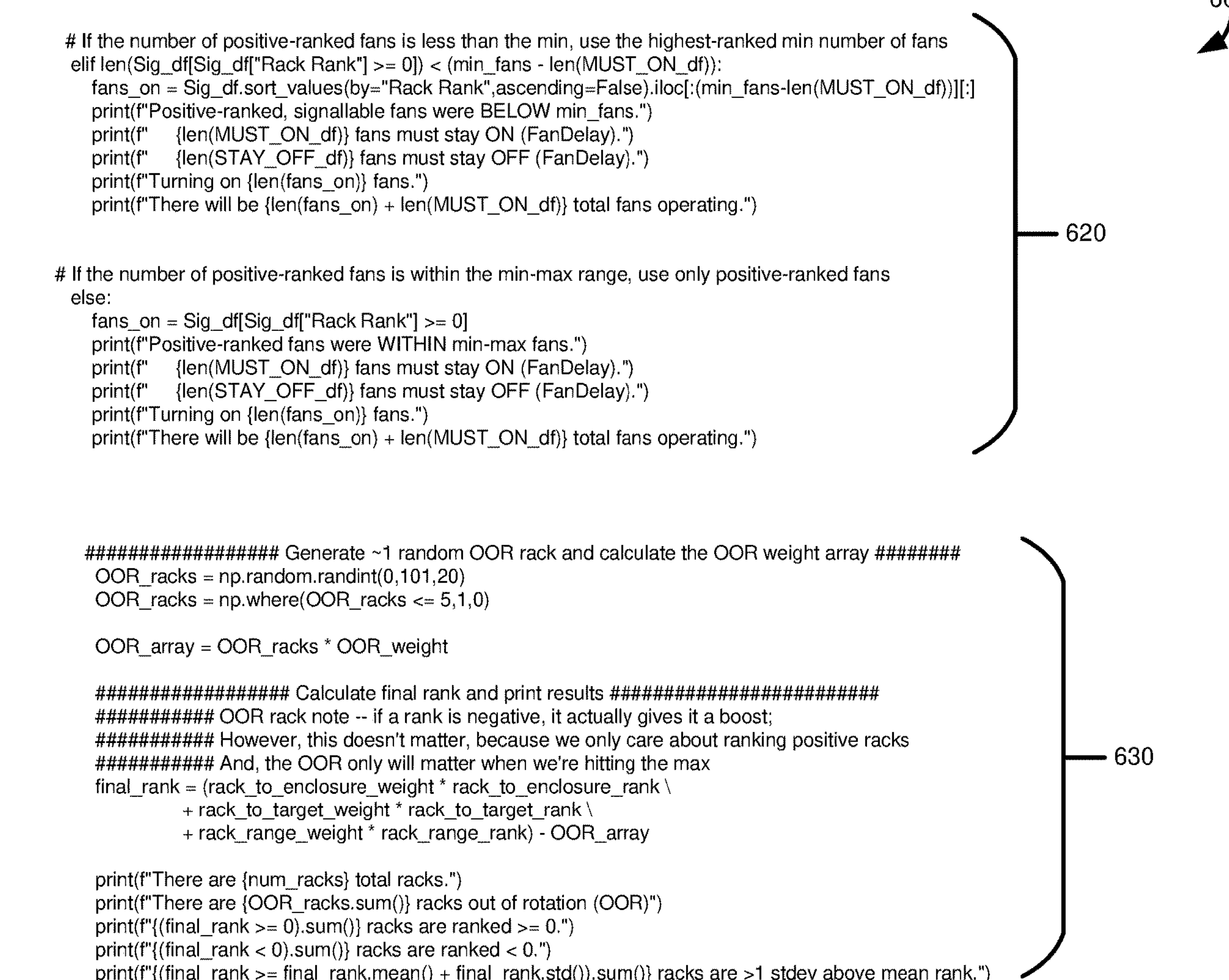

Example 9—Example Implementation of Battery Rack Ranking Techniques with Algorithmic Refinements FIGS. 6A-6C illustrates example pseudocode 600 that can be used to implement the active fan balancing algorithm refinements described in Examples 6-8. In particular, code lines 610 of FIG. 6A illustrate the use of dead band values in determining battery rack rankings for the different HVAC operational modes. Code lines 620 of FIGS. 6B and 6C illustrate how it is determined what battery rack fans should be turned on, accounting for fans that must remain in an ON or OFF state due to a fan delay parameter. Code lines 630 illustrate how the out of rotation weight can be used to adjust an initial ranking. The adjusted rankings can be used in execution of the code lines 620 to determine what fans should be turned on.

Example 10—Example Configuration Settings

FIG. 7 illustrates example configuration settings 700 that can be used to adjust the operation of the disclosed active fan balancing techniques, including to determine an operational mode of an HVAC unit. In a particular example, the configuration settings 700 can be stored in formats such as JSON or XML, although disclosed techniques are not limited to using such formats.

It is believed that the relevance of the configuration parameters 700 shown in FIG. 7 will be apparent from the preceding discussion. However various parameters or sets of parameters will be called out to assist the reader.

Parameters 710 are the weightings used for the parameters in the ranking algorithms 430, 432, 434 of FIG. 4B. Parameter 714 indicates a maximum allowable spread of standard deviations of cell temperatures within a rack, which can be used in operation 336 of FIG. 3. Parameter 718 sets a weighting value for out of rotation battery racks, while parameter 722 sets a target temperature for battery rack cells.

Parameters 726 set dead band values for the technique described in Example 8. Parameters 730 and 746 set various heating and cooling setpoints, as well as specify a default operational mode for HVAC units. Parameter 734 provides a fan delay value, such as described with respect to Example 7. Parameters 738 set minimum and maximum number of battery rack fans in an ON state. In some cases, these values can be a set number of fans, while in other cases the values can represent percentages of fans in an enclosure, which can be useful if different enclosures used in an overall system differ in the number of rack fans within the enclosures.

Parameter 742 determines how often a ranking algorithm should be executed, while parameter 750 specifies how often ranking/operational information should be provided as output from the algorithm, such as to a software application that can be used to monitor the operation of an energy storage unit, and optionally control the unit, including by adjusting values of the configuration settings 700.

Example 11—Example Active Fan Balancing Operations

Figure 8:
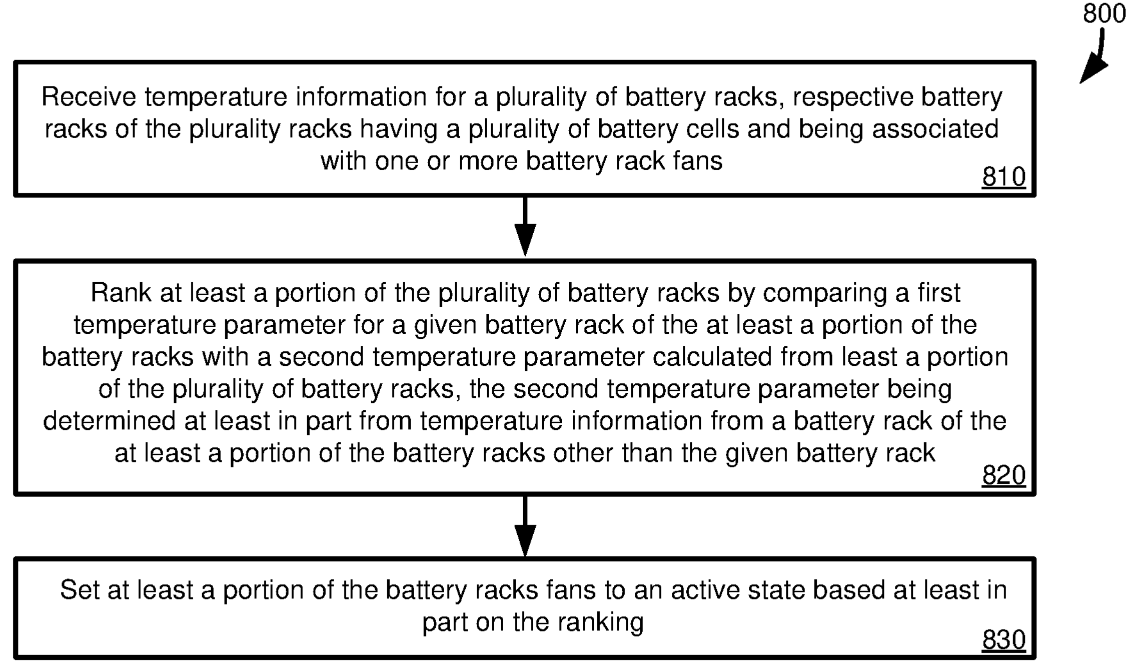
FIG. 8 is a flowchart of example operations in an active fan balancing technique.

FIG. 8 illustrates a flowchart of a process 800 for activating a portion of battery rack fans according to a ranking. In a particular implementation, the process 800 can be carried out in an apparatus as shown in FIG. 1.

At 810, temperature information is received for a plurality of battery racks, respective battery racks of the plurality of racks including a plurality of battery cells and being associated with one or more battery rack fans. At least a portion of the plurality of battery racks are ranked at 820 by comparing a first temperature parameter for a given battery rack of the at least a portion of the battery racks with a second temperature parameter calculated from at least a portion of the plurality of battery racks, the second temperature parameter being determined at least in part from temperature information from a battery rack of the at least a portion of the battery racks other than the given battery rack. At 830, at least a portion of the battery rack fans are set to an active state based at least in part on the ranking.

Example 12—Computing Systems

Figure 9:
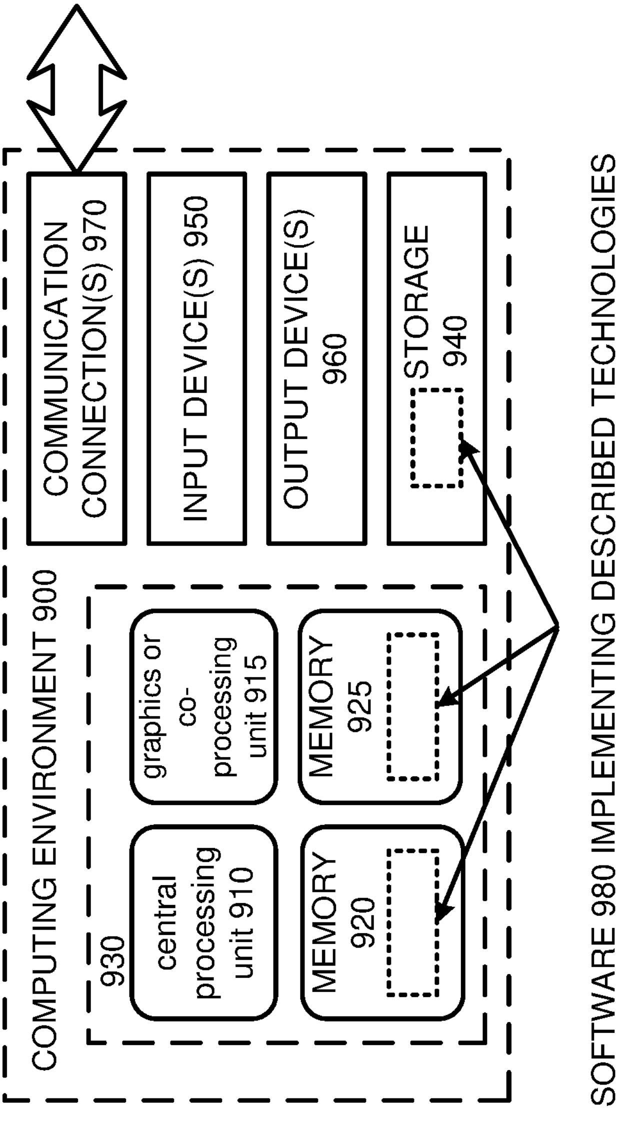
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality of the present disclosure, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing techniques described in Examples 1-11. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way, and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13—Cloud Computing Environment

Figure 10:
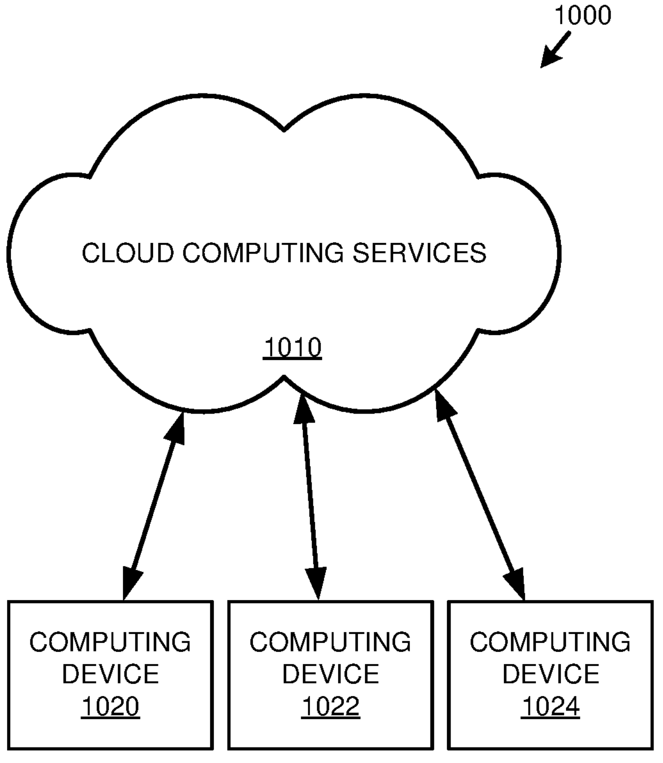
FIG. 10 is an example cloud computing environment that can be used in conjunction with the technologies described herein.

FIG. 10 depicts an example cloud computing environment 1000 in which the described technologies can be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operators (e.g., data processing, data storage, and the like).

Example 14—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C, C++, C #, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one memory;
one or more hardware processing units coupled to the at least one memory; and
one or more computer-readable storage media storing computer-executable instructions that, when executed, cause the computing system to perform operations comprising:
receiving temperature information for a plurality of battery racks, respective battery racks of the plurality of racks comprising a plurality of battery cells and being associated with one or more battery rack fans;
ranking at least a portion of the plurality of battery racks by comparing a first temperature parameter for a given battery rack of the at least a portion of the plurality of battery racks with a second temperature parameter calculated from at least a portion of the plurality of battery racks, the second temperature parameter being determined at least in part from temperature information from a battery rack of the at least a portion of the plurality of battery racks other than the given battery rack; and
setting at least a portion of the one or more battery rack fans to an active state based at least in part on the ranking.

2. The computing system of claim 1, wherein the ranking comprises comparing an average temperature for a given battery rack of the at least a portion of the plurality of battery racks with an average battery rack temperature calculated for the at least a portion of the plurality of battery racks.

3. The computing system of claim 1, wherein the ranking comprises determining a range between a hottest cell of a given battery rack and a coldest cell of a given battery rack.

4. The computing system of claim 3, wherein the ranking is determined at least in part based on a standard deviation of cell temperatures of a given battery rack and a battery rack having a greatest standard deviation of cell temperatures.

5. The computing system of claim 1, wherein the ranking comprises determining a difference between an average temperature for a given battery rack and a defined target battery cell temperature.

6. The computing system of claim 1, wherein the ranking comprises two or more parameters selected from (1) comparing an average temperature for a given battery rack of the at least a portion of the plurality of battery racks with an average battery rack temperature calculated for the at least a portion of the plurality of battery racks, (2) determining a range between a hottest cell of a given battery rack and a coldest cell of a given battery rack, or (3) determining a difference between an average temperature for a given battery rack and a defined target battery cell temperature, the operations further comprising:
calculating an overall ranking using a weighted combination of the two or more parameters.

7. The computing system of claim 6, wherein the ranking comprises a weighted combination of parameters determined by:
(1) comparing an average temperature for a given battery rack of the at least a portion of the plurality of battery racks with an average battery rack temperature calculated for the at least a portion of the plurality of battery racks;
(2) determining a range between a hottest cell of a given battery rack and a coldest cell of a given battery rack; and
(3) determining a difference between an average temperature for a given battery rack and a defined target battery cell temperature.

8. The computing system of claim 1, wherein the ranking comprises two or more parameters selected from (1) comparing an average temperature for a given battery rack of the at least a portion of the plurality of battery racks with an average battery rack temperature calculated for the at least a portion of the plurality of battery racks, (2) determining a range between a hottest cell of a given battery rack and a coldest cell of a given battery rack, or (3) determining a quotient at least in part of a standard deviation of cell temperatures of a given battery rack and a battery rack having a greatest standard deviation of cell temperatures, the operations further comprising:
calculating an overall ranking using a weighted combination of the two or more parameters.

9. The computing system of claim 8, wherein the ranking comprises a weighted combination of parameters determined by:
(1) comparing an average temperature for a given battery rack of the at least a portion of the plurality of battery racks with an average battery rack temperature calculated for the at least a portion of the plurality of battery racks;
(2) determining a range between a hottest cell of a given battery rack and a coldest cell of a given battery rack; and
(3) determining a quotient at least in part of a standard deviation of cell temperatures of a given battery rack and a battery rack having a greatest standard deviation of cell temperatures.

10. The computing system of claim 1, wherein the plurality of battery racks are located within an energy storage unit comprising one or more HVAC units.

11. The computing system of claim 10, wherein different sets of ranking algorithms are used for at least two operational modes of the one or more HVAC units, the at least two operational modes of the one or more HVAC units comprising a cooling mode, a heating mode, and an idling mode.

12. The computing system of claim 1, wherein the ranking and the setting are performed according to a defined interval.

13. The computing system of claim 1, wherein, for battery rack fans of the one or more battery rack fans switching between an ON state and an OFF state or between an OFF state and an ON state, applying a fan delay period to a corresponding battery rack, wherein, at least absent an override condition, battery rack fan states are not switched until an expiration of the fan delay period.

14. The computing system of claim 1, wherein the at least a second temperature parameter is adjusted by a defined dead band value.

15. The computing system of claim 1, the operations further comprising:

measuring at least one battery cell temperature of at least one battery cell of a battery rack of the plurality of battery racks;

determining a temperature based at least in part on the at least one battery cell temperature;

comparing the temperature with a threshold;

determining that the temperature exceeds the threshold; and based at least in part on the determining that the temperature exceeds the threshold, overriding an operational state of at least one HVAC unit in fluid communication with the plurality of battery racks.

16. The computing system of claim 15, wherein the temperature is calculated as an average cell temperature of measured cell temperatures of battery cells of the plurality of battery racks.

17. The computing system of claim 1, the operations further comprising:

measuring at least one battery cell temperature of at least one battery cell of a battery rack of the plurality of battery racks;

determining a temperature based at least in part on the at least one battery cell temperature; and adjusting a heating or cooling setpoint of at least one HVAC unit in fluid communication with the plurality of battery racks based at least in part on the temperature.

18. The computing system of claim 17, wherein the temperature is calculated as an average cell temperature of measured cell temperatures of battery cells of the plurality of battery racks.

19. A method, implemented in a computing system comprising at least one hardware processor and at least one memory coupled to the at least one hardware processor, the method comprising:

receiving temperature information for a plurality of battery racks, respective battery racks of the plurality of racks comprising a plurality of battery cells and being associated with one or more battery rack fans;

ranking at least a portion of the plurality of battery racks by comparing a first temperature parameter for a given battery rack of the at least a portion of the plurality of battery racks with a second temperature parameter calculated from at least a portion of the plurality of battery racks, the second temperature parameter being determined at least in part from temperature information from a battery rack of the at least a portion of the plurality of battery racks other than the given battery rack; and setting at least a portion of the plurality of battery rack fans to an active state based at least in part on the ranking.

20. One or more non-transitory computer-readable storage media comprising computer-executable instructions that, when executed by a computing system comprising at least one hardware processor and at least one memory coupled to the at least one hardware processor, cause the computing system to:

receive temperature information for a plurality of battery racks, respective battery racks of the plurality of racks comprising a plurality of battery cells and being associated with one or more battery rack fans;

rank at least a portion of the plurality of battery racks by comparing a first temperature parameter for a given battery rack of the at least a portion of the plurality of battery racks with a second temperature parameter calculated from at least a portion of the plurality of battery racks, the second temperature parameter being determined at least in part from temperature information from a battery rack of the at least a portion of the plurality of battery racks other than the given battery rack; and set at least a portion of the plurality of battery rack fans to an active state based at least in part on the ranking.

* * * * *